(12) United States Patent
Crampton

(10) Patent No.: US 11,338,972 B2
(45) Date of Patent: May 24, 2022

(54) DRINKING VESSEL STORAGE CONTAINER COMBINATIONS

(71) Applicant: Darren Crampton, Windermere, FL (US)

(72) Inventor: Darren Crampton, Windermere, FL (US)

( * ) Notice: Subject to any disclaimer, the term of this patent is extended or adjusted under 35 U.S.C. 154(b) by 217 days.

(21) Appl. No.: 16/727,407

(22) Filed: Dec. 26, 2019

(65) Prior Publication Data

US 2020/0207529 A1 Jul. 2, 2020

Related U.S. Application Data

(63) Continuation-in-part of application No. 29/677,032, filed on Jan. 16, 2019, now Pat. No. Des. 901,977.

(Continued)

(51) Int. Cl.
| | |
|---|---|
| *B65D 51/24* | (2006.01) |
| *A47G 19/22* | (2006.01) |
| *A47J 41/00* | (2006.01) |
| *B65D 81/38* | (2006.01) |
| *B65D 85/72* | (2006.01) |
| *B65D 25/20* | (2006.01) |
| *B65D 23/12* | (2006.01) |
| *B65D 81/32* | (2006.01) |

(Continued)

(52) U.S. Cl.
CPC .......... *B65D 51/24* (2013.01); *A47G 19/2272* (2013.01); *A47G 19/23* (2013.01); *A47J 41/0011* (2013.01); *B65D 21/0223* (2013.01); *B65D 21/0228* (2013.01); *B65D 23/12* (2013.01); *B65D 25/20* (2013.01); *B65D 81/32* (2013.01); *B65D 81/3205* (2013.01); *B65D 81/3837* (2013.01); *B65D 85/72* (2013.01); *B65D 2251/009* (2013.01)

(58) Field of Classification Search
CPC .... B65D 23/12; B65D 21/0223; B65D 81/32; B65D 81/3205; B65D 51/24; B65D 25/20; B65D 81/3837; B65D 85/72; B65D 21/0228; A47G 19/23; A47G 19/2272; A47G 19/2205; A45F 3/16
See application file for complete search history.

(56) References Cited

U.S. PATENT DOCUMENTS

| 7,866,183 B2 | 1/2011 | Roth et al. |
| 8,051,997 B2 | 11/2011 | Buckley |

(Continued)

*Primary Examiner* — Don M Anderson
*Assistant Examiner* — Jennifer Castriotta

(57) ABSTRACT

A drinking vessel storage container combination is provided herein. The combination comprises: a first body; a first cap demountably coupled to the first body; and a storage container demountably coupled to the first body opposite the first cap. The first cap comprises a lid, a port, and a strainer. The storage container comprises a second body, a second cap, a panel, and an insert. The first body is hollow, open-faced, and substantially cylindrical in shape. The bottom face is configured to allow the storage container to be demountable affixed thereto. The strainer is positioned adjacent to the port and within the chamber when the first cap is demountably affixed to the first body. The insert is selectively positioned within the second body. The panel is selectively positioned on top of the insert. The second cap is demountably affixed to the second body and the bottom face.

9 Claims, 34 Drawing Sheets

Related U.S. Application Data

(60) Provisional application No. 62/787,668, filed on Jan. 2, 2019.

(51) Int. Cl.
*A47G 19/23* (2006.01)
*B65D 21/02* (2006.01)

(56) References Cited

U.S. PATENT DOCUMENTS

| | | | |
|---|---|---|---|
| 8,342,349 B2 * | 1/2013 | Lu | A47G 19/00 220/23.86 |
| 8,353,419 B2 | 1/2013 | Jung | |
| 9,272,822 B2 | 3/2016 | Samartgis | |
| 9,656,191 B2 | 5/2017 | Hull et al. | |
| 10,301,054 B2 * | 5/2019 | Pell | A47G 19/2205 |
| 2014/0091086 A1 * | 4/2014 | Sorensen | A47G 19/2205 220/4.27 |
| 2014/0360908 A1 * | 12/2014 | Sorensen | B65D 51/28 206/501 |
| 2015/0329255 A1 | 11/2015 | Rzepecki | |
| 2018/0368623 A1 * | 12/2018 | Cerasani | A47J 31/44 |

* cited by examiner

DRINKING VESSEL STORAGE CONTAINER COMBINATIONS

CROSS-REFERENCE TO RELATED APPLICATION

This application claims priority to U.S. Provisional Application No. 62/787,668 filed Jan. 2, 2019 and incorporated herein by reference in its entirety.

FIELD OF THE INVENTION

The present invention relates generally to drinking vessels and specifically to drinking vessel storage container combinations.

BACKGROUND OF THE INVENTION

Currently, individuals typically carry beverages utilizing a variety of means ranging from pre-packaged beverage containers to personal traveling beverage containers. As per the later, there are a wide variety of different kinds and types of personal traveling beverage containers for storing beverages ranging from sport bottles to jugs. However, there are many desired improvements, for example, storage and insulation solutions.

An objective of the present invention is to provide drinking vessel storage container combinations incorporating storage and insulation solutions.

BRIEF DESCRIPTION OF THE DRAWINGS

Some of the embodiments will be described in detail with reference to the following figures ("FIGS."), wherein the designations denote like members, wherein.

Figure 1:
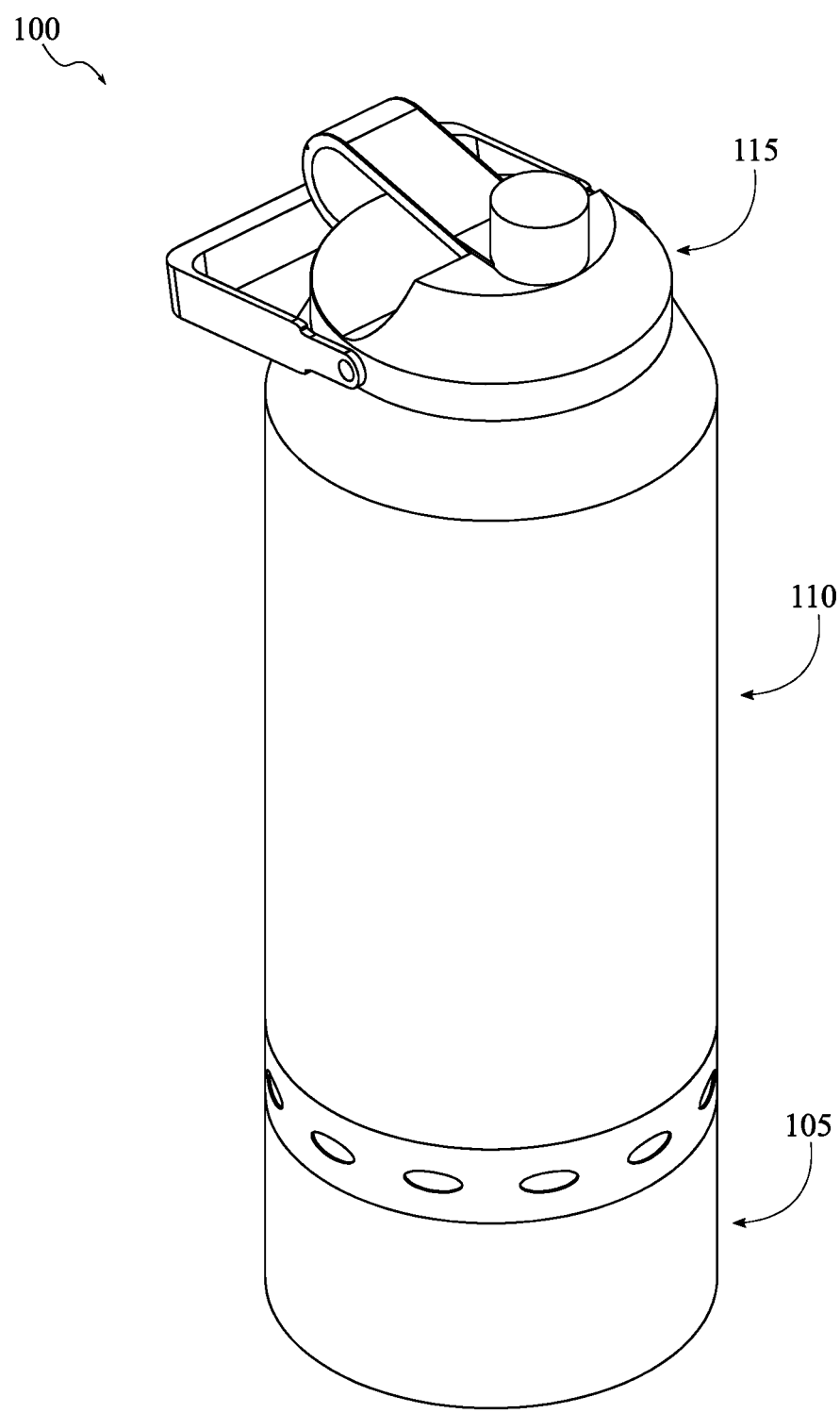
FIG. 1 is a perspective view of a drinking vessel storage container combination ("the combination") according to some embodiments.

Unless otherwise specifically noted, articles depicted in the drawings are not necessarily drawn to scale.

DETAIL DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the disclosed aspects of the disclosure and may further incorporate only one or a plurality of the features disclosed herein. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Other technical advantages may become readily apparent to one of ordinary skill in the art after review of the following figures and description. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

Unless otherwise indicated, the drawings are intended to be read together with the specification and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure as the particular drawing figure faces the reader. Similarly, the terms "inwardly," "outwardly" and "radially" generally refer to the orientation of a surface relative to its axis of elongation, or axis of rotation, as appropriate.

Currently, individuals typically carry beverages utilizing a variety of means ranging from pre-packaged beverage containers to personal traveling beverage containers. As per the later, there are a wide variety of different kinds and types of personal traveling beverage containers for storing beverages ranging from sport bottles to jugs. However, there are many desired improvements, for example, storage and insulation solutions.

An objective of the present invention is to provide drinking vessel storage container combinations incorporating storage and insulation solutions. In some embodiments, the combination includes: a first body; a first cap demountably coupled to the first body; and a storage container demountably coupled to the first body opposite the first cap. The first cap comprises a lid, a port, and a strainer. The storage container comprises a second body, a second cap, a panel, and an insert. The first body is hollow, open-faced, and substantially cylindrical in shape. The bottom face is configured to allow the storage container to be demountable affixed thereto. The strainer is positioned adjacent to the port and within the chamber when the first cap is demountably affixed to the first body. The insert is selectively positioned within the second body. The panel is selectively positioned on top of the insert. The second cap is demountably affixed to the second body and the bottom face.

Figure 2:
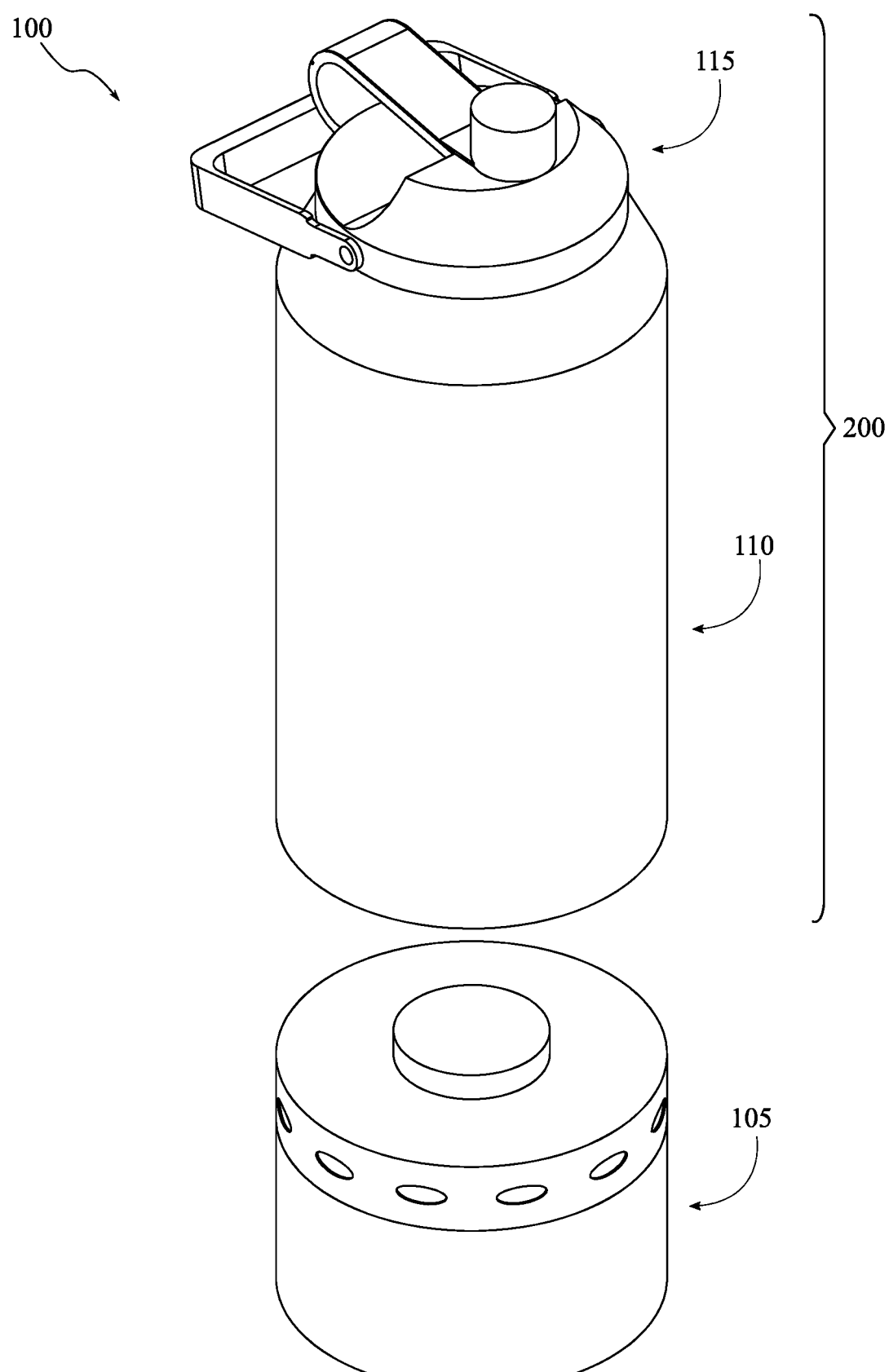
FIG. 2 is a partially exploded view of the combination according to other embodiments.

Referring now to FIGS. 1 and 2, which depict perspective and exploded views, respectively, of a drinking vessel storage container combination ("the combination"), generally 100, according to some embodiments.

Figure 5:
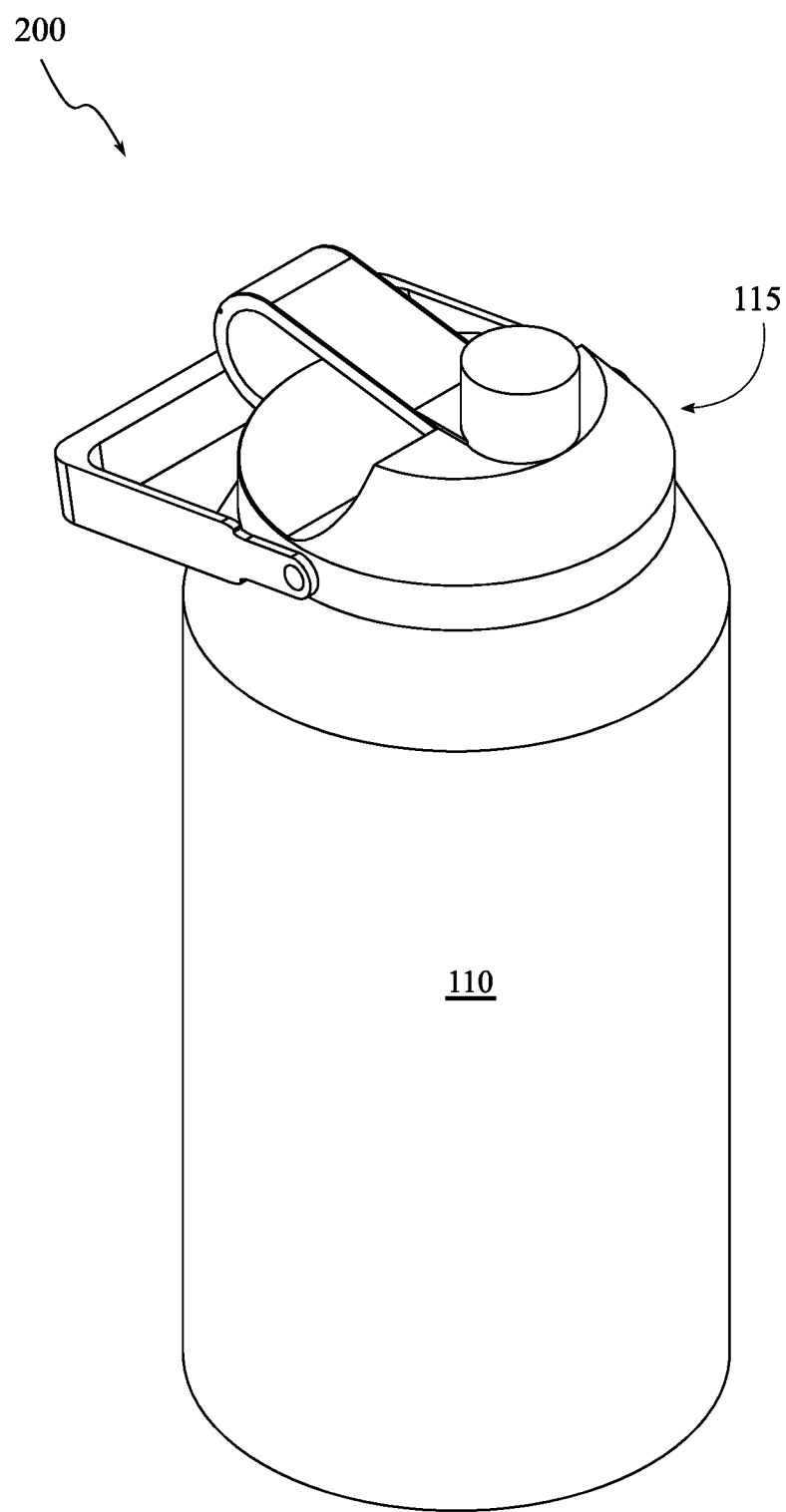
FIG. 5 is a perspective view of a drinking vessel of the combination according to other embodiments.
Figure 6:
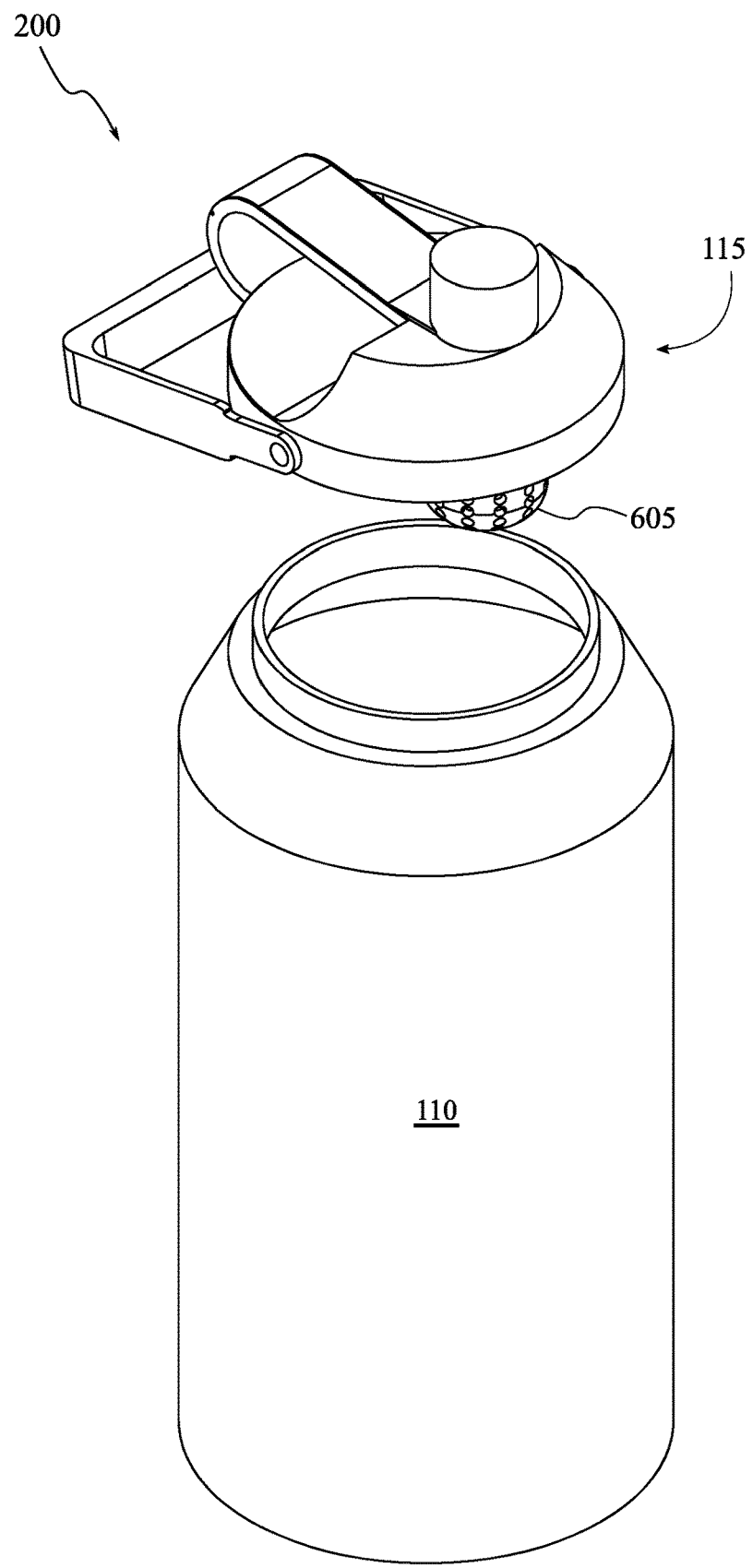
FIG. 6 is an exploded view of the drinking vessel according to certain embodiments.

The combination preferably includes a first body 110, a first cap 115, and a storage container 105. For example, the first body 110 and first cap 115 form a drinking vessel 200 (as shown in FIGS. 5-6). The first cap 115 is preferably demountably coupled to the first body 110. For example, the first cap 115 can be a twist-on cap, a crown cap, a snap cap, a friction fit cap, a wedge cap, or similar closure that can close and/or seal the first body 110. According to some embodiments, the first cap 115 includes threaded structures to allow the first cap 115 to be screwed on to (i.e. threadable engagement) the first body 110. In other embodiments, the first cap 115 includes snap-together couplers configured to connect with complementary parts of the first body 110 by snap-action, which is characterized by a rapid resilient movement towards the first body 110, immediately precipitated by the reduction of a resisting force, when the two structures are joined by shifting them laterally in a substantially co-planar fashion.

According to certain embodiments, the first cap 115 and the first body 110 are frictionally held together (i.e. restrained from motion by frictional force). The drinking vessel 200 typically has a height greater than that of the storage container 105. In some embodiments, the drinking vessel 200 has a shape, size, features, and/or components of a jug (e.g., a large container for liquids, with a narrow mouth and typically a stopper or cap), as depicted in FIGS. 1, 2, 5, and 6. In general, the drinking vessel 200 can have any shape, size, features, and/or components that would fulfill the objectives and intents of the instant disclosure, in accordance with some embodiments.

The storage container 105 is demountably coupled to the first body 110 opposite the first cap 115 (i.e. positioned opposite the first cap 115). According to some embodiments, the storage container 105 includes threaded structures to allow it to be screwed on to (i.e. threadable engagement) the first body 110. In other embodiments, the storage container 105 includes snap-together couplers configured to connect with complementary parts of the first body 110 by snap-action, which is characterized by a rapid resilient movement towards the first body 110, immediately precipitated by the reduction of a resisting force, when the two structures are joined by shifting them laterally in a substantially co-planar fashion.

According to certain embodiments, the storage container 105 and the first body 110 are frictionally held together (i.e. restrained from motion by frictional force). First body 110 is preferably double walled and vacuum sealed with a copper lining and a stainless-steel exterior. Hence, the combination 100 incorporates three forms of drinkware insulation.

Not to be limited by theory, the double wall insulation eliminates condensation on the exterior wall while retaining the internal temperature longer through various levels of insulation. The vacuum insulation removes all the air between the inner and outer walls. This vacuum practically eliminates connection through which heat or cold is transferred away from its source. The copper inner wall helps to further ensure beverages keep their temperature for extended periods of time. Copper is a natural insulator, and its placement on the inner wall provides a maximum insulating benefit.

The combination 100 can include any shape, size, material, features, type or kind, orientation, location, quantity, components, and arrangements of components that would allow fulfillment of the objectives and intents of the present disclosure. However, the combination 100 is preferably made of a material that is thermally insulating, impact resistant, light weight, and easily manufacturable. Components of the combination 100 can be formed using a variety of manufacturing processes. Application manufacturing processes include, but are not limited to, molding, stamping, machining, joining, forming, casting, and similar manufacturing processes.

Components of the combination 100 are preferably formed using a variety of substrates, including, but not limited to, polymers, metals, alloys, or a combination of two or more thereof according to some embodiments. Applicable substrates include, but are not limited to, high impact material (e.g., polystyrenes, ABS, polycarbonates, PPSU, glass epoxies, HDPE, and similar high impact materials), thermal insulating material (e.g., materials that reduce the rate at which contents included therein reach thermal equilibrium with the external ambient environment. As used herein "high impact materials" refer to materials that can, for example, sustain impacts from up to 6 feet high.

Figure 3:
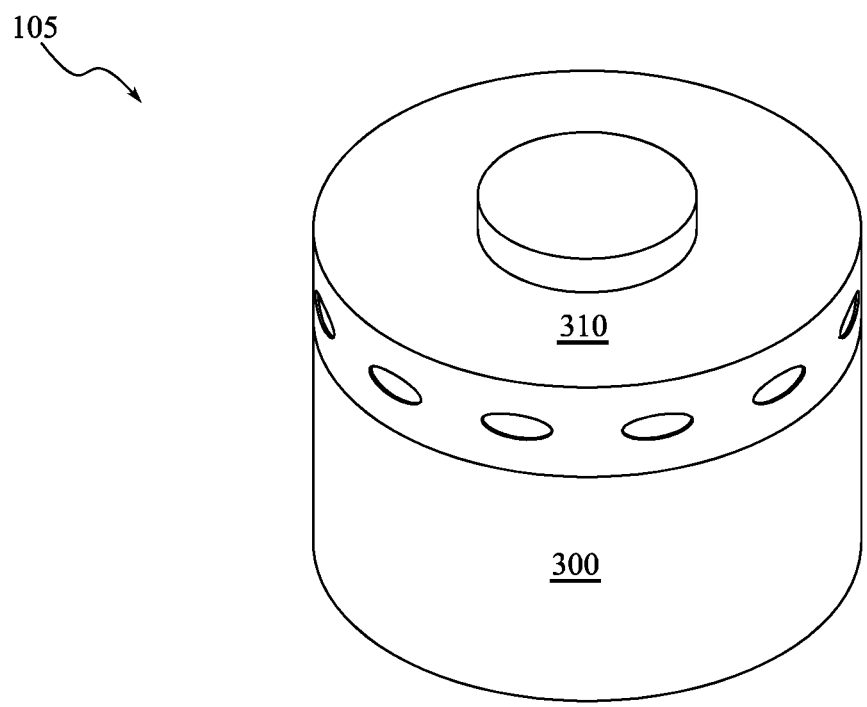
FIG. 3 is a perspective view of a storage container of the combination according to certain embodiments.
Figure 4:
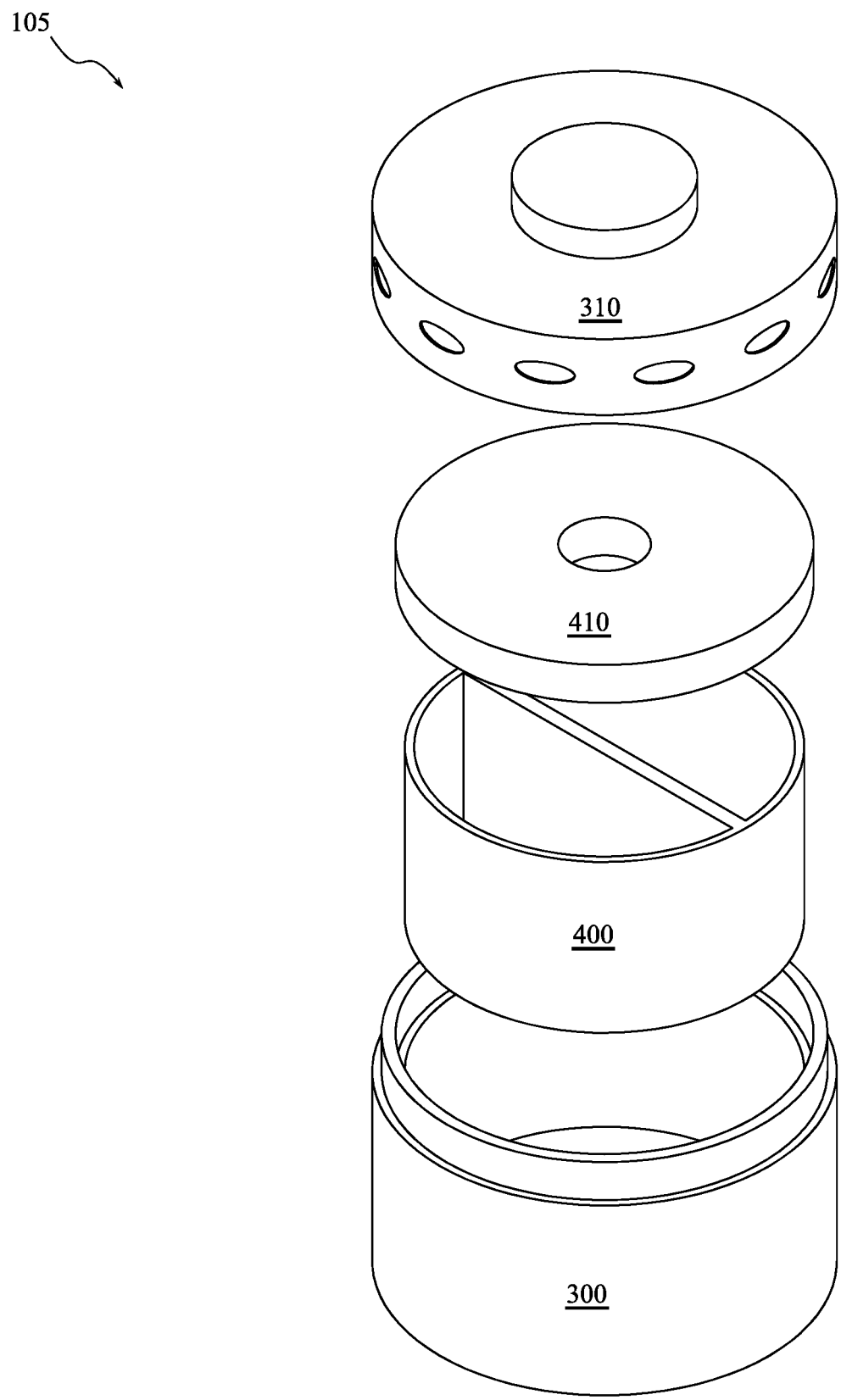
FIG. 4 is an exploded view of the storage container according to some embodiments.

FIGS. 3-4, depict a perspective and exploded view, respectively, of the storage container 105 according to certain embodiments. The storage container 105 preferably includes a second body 300, a second cap 310, a panel 410, and an insert 400. The storage container 105 can include of any shape, size, material, features, type or kind, orientation, location, quantity, components, and arrangements of components that would allow for fulfillment of the objectives and intents of the instant disclosure. However, it is preferred that the height of the storage container 105 is significantly smaller (e.g., at least 50% smaller than the drinking vessel 200) than that of the first body 110. It is preferred that the storage container 105 and the first body 110 are similar in diameter and shape. For example, the storage container 105 and the first body 110 are each cylindrical in shape.

In certain embodiments, the insert 400 is selectively positioned within the second body 300. The insert 400 is preferably a portable food, beverage, and/or personal belongings container. Here, for example, the panel 410 is selectively positioned on top of the insert 400. The second cap 310 preferably configured to be demountably affixed to the second body 300 and, as discussed further below, the bottom face 2225 according to other embodiments. In certain embodiments, the second cap 310 includes insulating materials.

Figure 9:
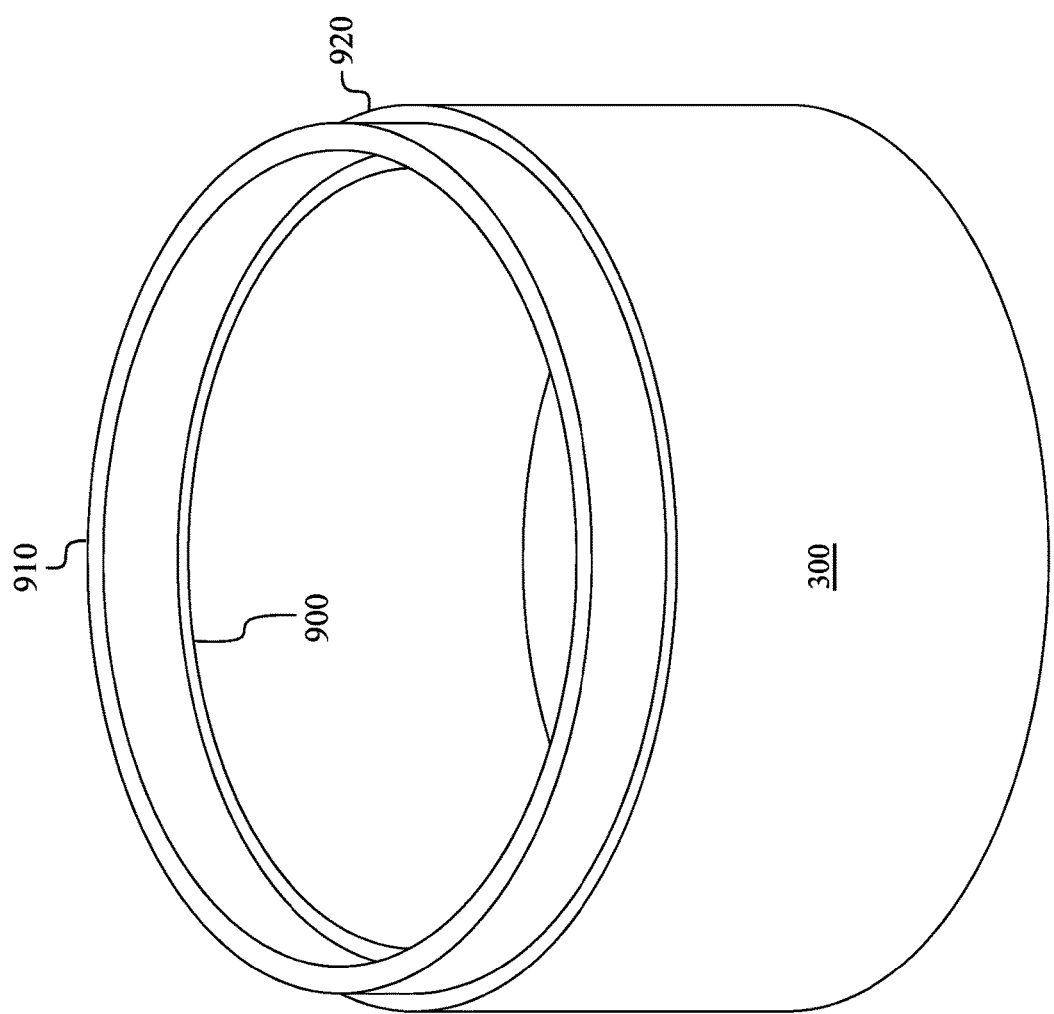
FIG. 9 is a perspective view of a second body of the storage container according to other embodiments.
Figure 10:
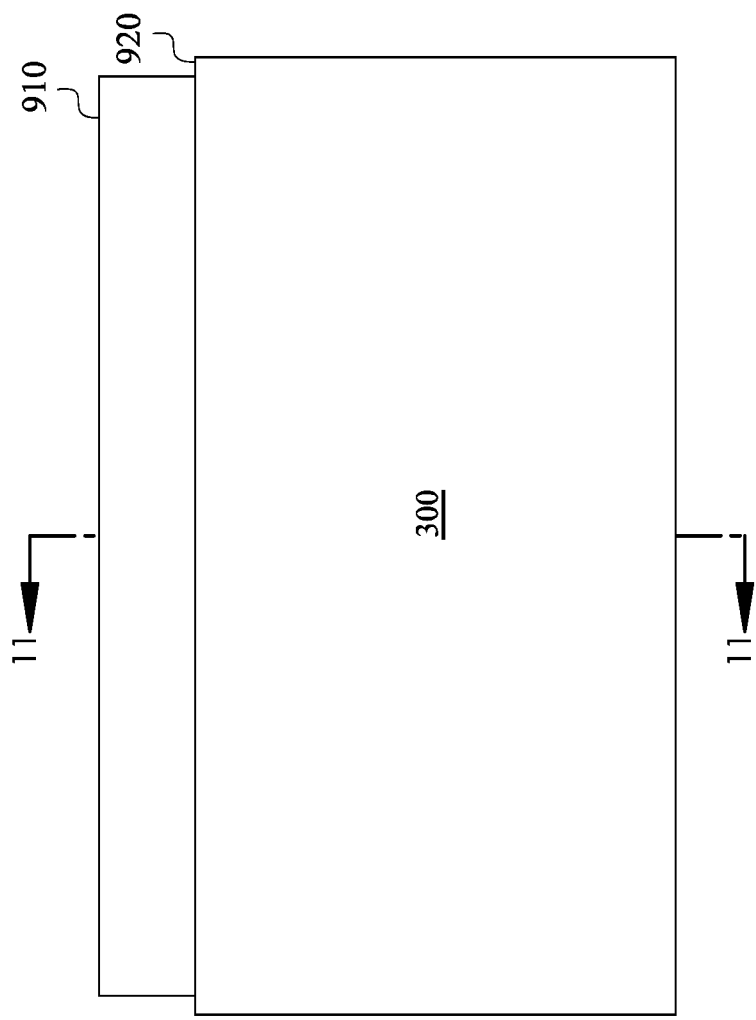
FIG. 10 is a side view of the second body according to certain embodiments.
Figure 11:
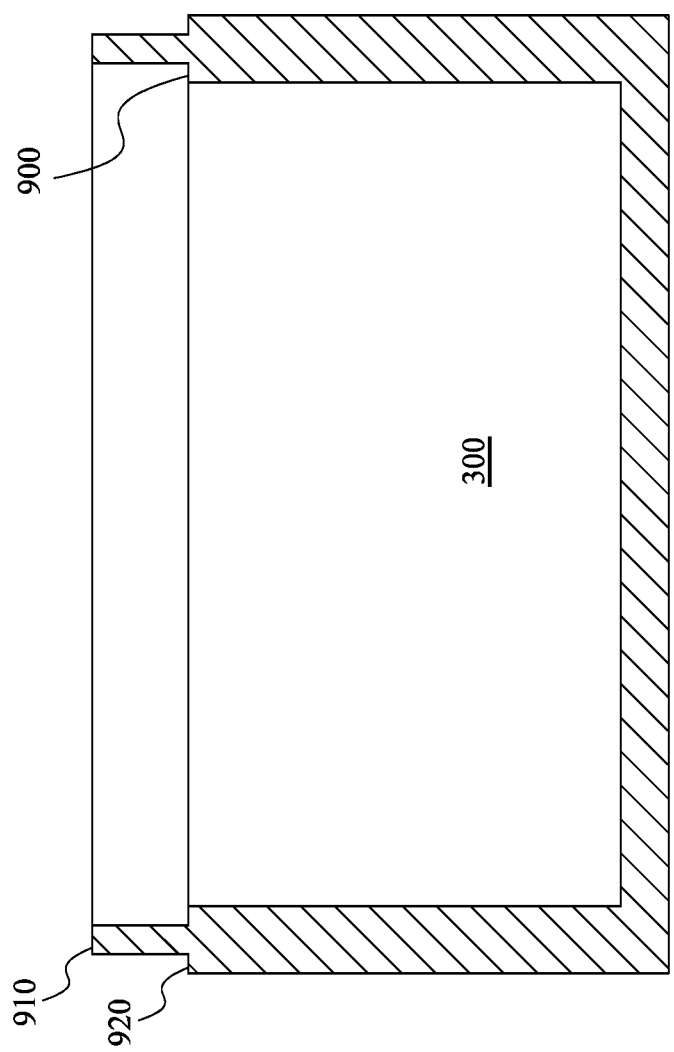
FIG. 11 is a cross-sectional view of the second body taken along line 11-11 of FIG. 10 according to yet still other.

As seen in FIG. 9 through FIG. 11, the storage container 105 contains the second body 300. The second body 300 preferably has a hollow, cylindrical-like shape. The second body 300 can be of any shape, size, type or kind; include any materials features, orientation, location, quantity, components, and arrangements of components that would allow the present invention to fulfill the objectives and intents of the present invention. In certain embodiments, second body 300 is double walled and vacuum sealed with a copper lining and a stainless-steel exterior. In some embodiments, the outer surface of the top end of the second body 300 is of a shape, size, kind, and/or type such that the second cap 310 can be positioned atop the second body 300, as illustrated in FIG. 3. For example, the inner surface of the second body 300 is of a shape, size, kind, and/or type that allows the insert 400 to be positioned therein (e.g., has a shape complementary to the insert 400), as illustrated in FIG. 4. The second body 300 typically contains a first ring 900, a second ring 910, and a third ring 920 concentrically positioned therein, as depicted in FIG. 9. Here, the second ring 910 is positioned adjacent to the first ring 900 and the third ring 920. The first ring 900 is positioned within the second body 300 and thereby forms the internal wall thereof according to some embodiments.

The second ring 910 is preferably positioned (e.g., extends) above the first ring 900 and the third ring 920. In other words, the second ring 910 is greater in height compared to both the first ring 900 and the third ring 920. In certain embodiments, the third ring 920 is externally positioned on the second body 300 and thereby forms the external wall thereof. It is preferred that the second ring 910 have an outer diameter similar to the inner diameter of the second cap 310. It is preferred that the second ring 910 have an inner diameter similar to the outer diameter of the panel 410. In general, the first ring 900, the second ring 910, and/or the third ring 920 can be of any shape, size, type or kind; include any materials, features, orientation, location, quantity, components, and arrangements of components that would allow the present invention to fulfill the objectives and intents of the instant disclosure.

In certain embodiments, the panel 410 and the second ring 910 are similar in diameter, which, for example, allows the panel 410 to be positioned flush within the second ring 910 when positioned within the second body 300. The panel 410 is positioned (e.g., sits or rests) on the first ring 900 proximate to the second cap 310 when the panel 410 is positioned within the second body 300 and the second cap 310 is demountably coupled to the second body 300 according to other embodiments.

Figure 12:
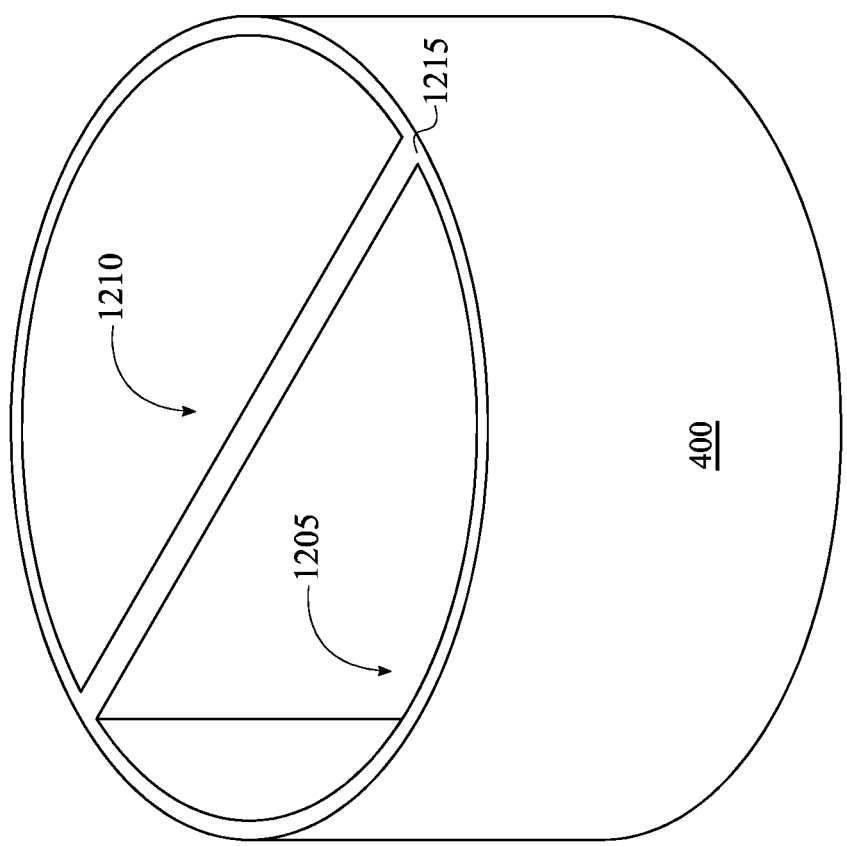
FIG. 12 is a perspective view of the insert of the storage container according to certain embodiments.
Figure 13:
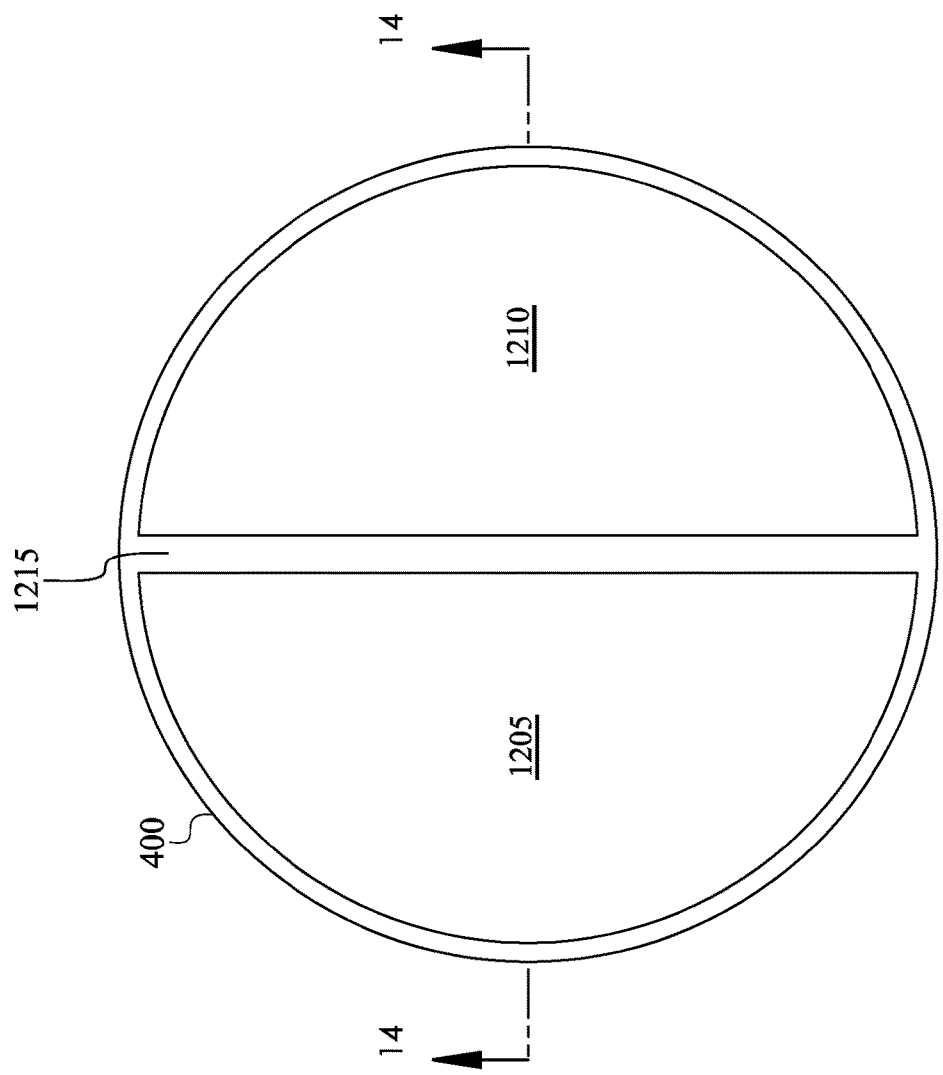
FIG. 13 is a top view of the insert according to some embodiments.
Figure 14:
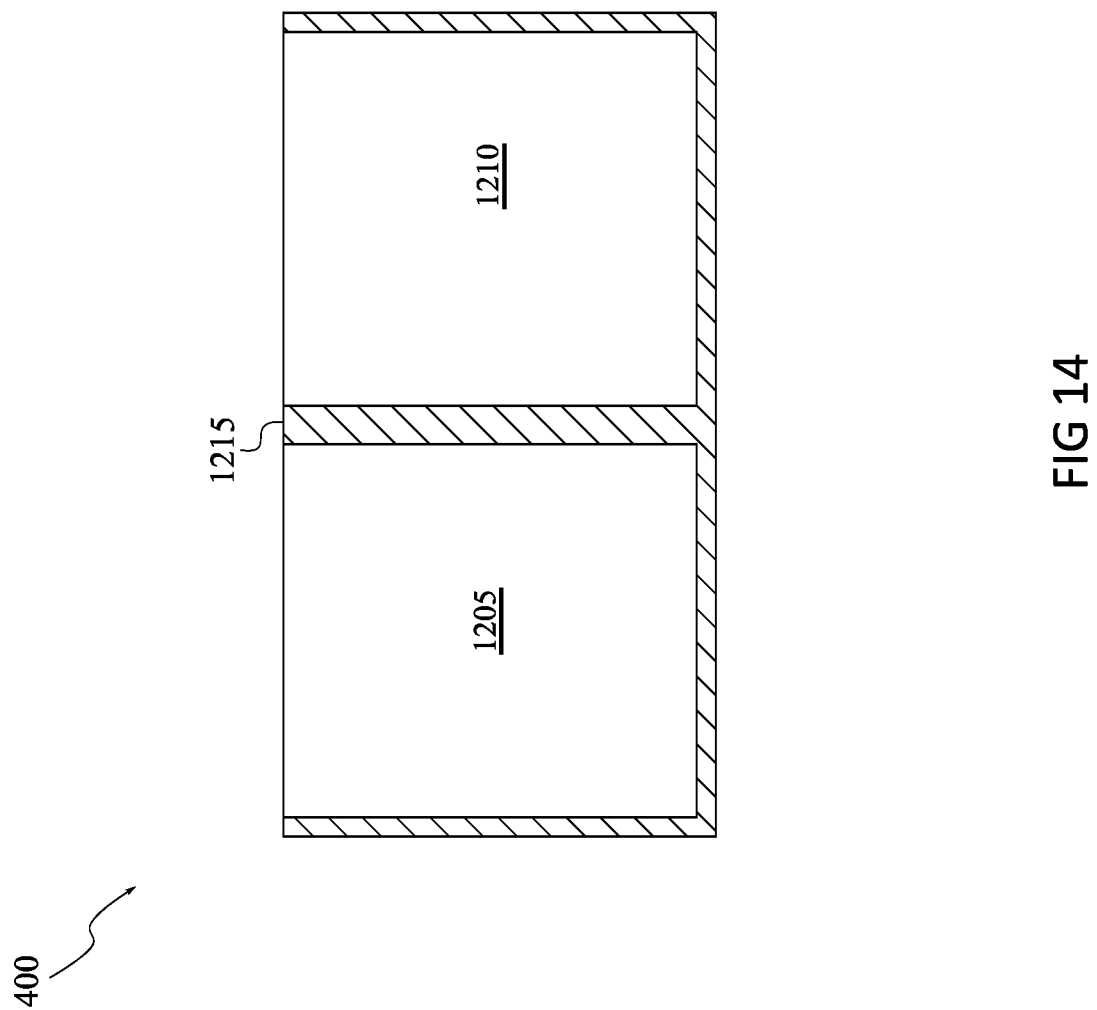
FIG. 14 is a cross-sectional view of the insert taken along line 14-14 of FIG. 13 according to other embodiments.

FIG. 12 through FIG. 14 depict various views of the insert 400 according to yet still other embodiments. The insert 400 can be of any shape, size, type or kind; include any materials, features, orientation, location, quantity, components, and arrangements of components capable of fulfilling the objectives and intents of the instant disclosure. The insert 400 preferably has a hollow, open-faced cylindrical-like shape and includes a divider 1215 medianly and vertically positioned therein. For example, the insert 400 and the first ring 900 are substantially equal in height when the insert 400 is positioned within the second body 300. The insert 400 and the first ring 900 are substantially equal in diameter.

The insert 400 preferably sits flush within the first ring 900 when the insert 400 is positioned within the second ring 910. Here, the insert 400 preferably has a diameter substantially equal to the inner diameter of the first ring 900. The insert 400 can include a plurality of open-face compartments (e.g., compartments 1205 and 1210). The plurality of compartments can be of any shape, size, type or kind; and include any material, features, orientation, location, quantity, components, and arrangements of components that would fulfill the objectives and intents of the instant disclosure. However, it is preferred that the plurality of compartments have a semi-circular shape or a shape that at least partially complements the insert 400. In other embodiments, the insert 400 is formed of two or more separable individual compartment units that together form the insert 400.

Figure 15:
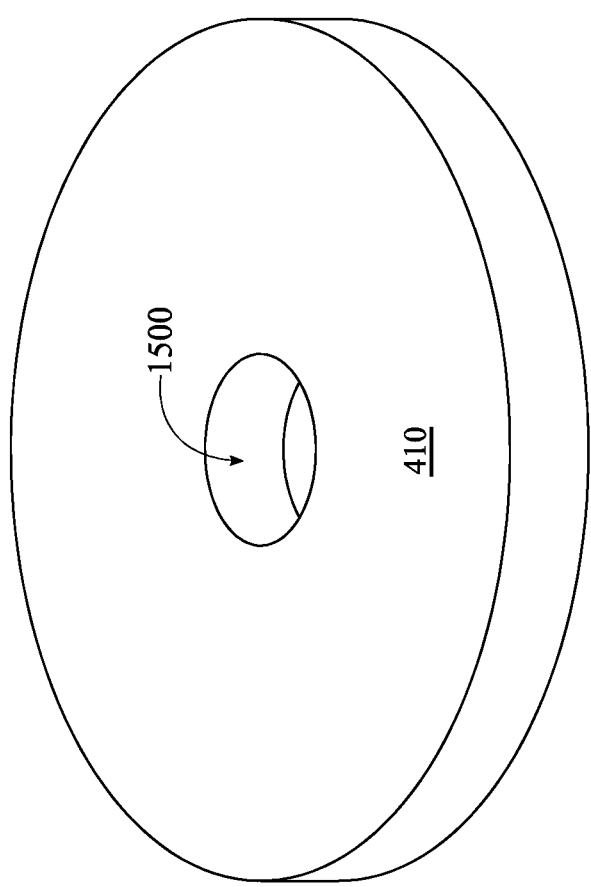
FIG. 15 is a perspective view of a panel of the storage container according to certain embodiments.

Turning now to the panel 410. FIG. 15 depicts a perspective view of the panel 410. The panel 410 can be of any shape, size, type or kind; and include any material, features, orientation, location, quantity, components, and arrangements of components that would fulfill the objectives and intents of the instant disclosure. However, the panel 410 is preferably fabricated using materials similar to that of the storage container 105. The panel 410 is preferably flat, circular, and disc-like is shape. For example, panel 410 can have an outer diameter substantially similar to the inner diameter of the second ring 910. In certain embodiments, the panel 410 preferably include a third aperture 1500 concentrically positioned therein and having a diameter significantly smaller than the outer diameter of the panel 410. For example, the third aperture 1500 facilitates the removal of the panel 410 from the storage container 105. For example, the diameter of the third aperture 1500 is wide enough receive a digit. In certain embodiments, the panel 410 has a height substantially similar to the difference in the heights of the second ring 910 and the first ring 900.

Figure 16:
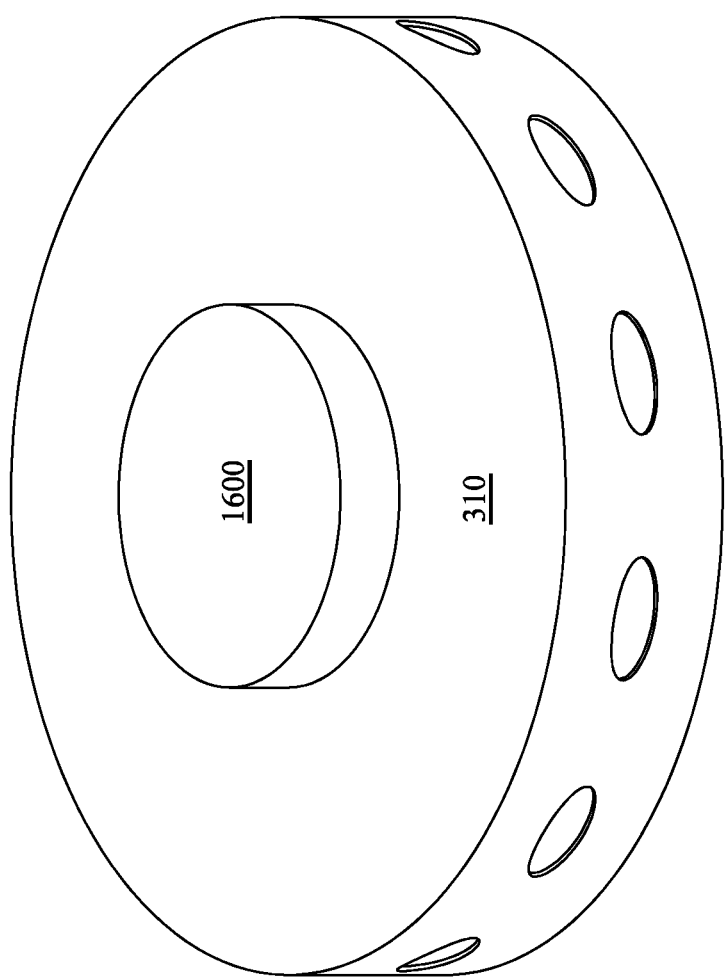
FIG. 16 is a perspective view of a second cap of the storage container according to yet still other embodiments.
Figure 17:
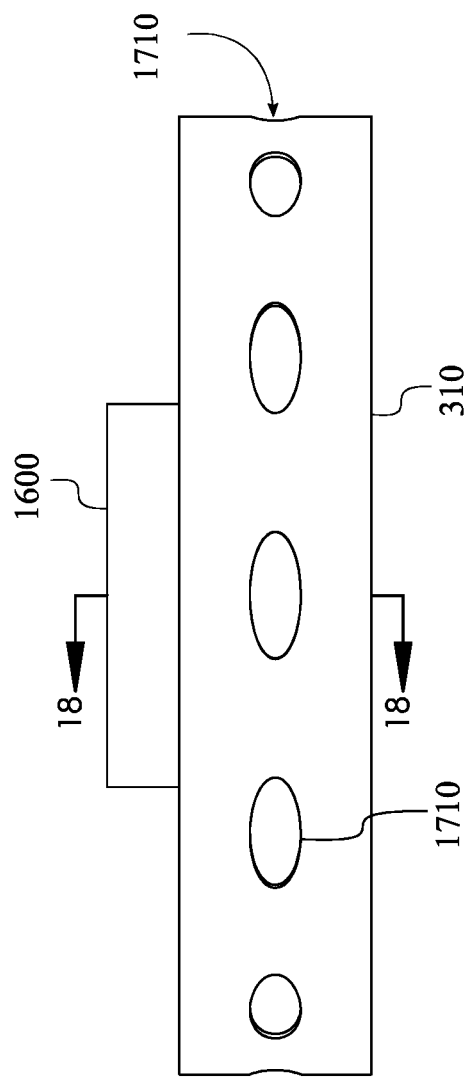
FIG. 17 is a side view of the second cap according to some embodiments.
Figure 18:
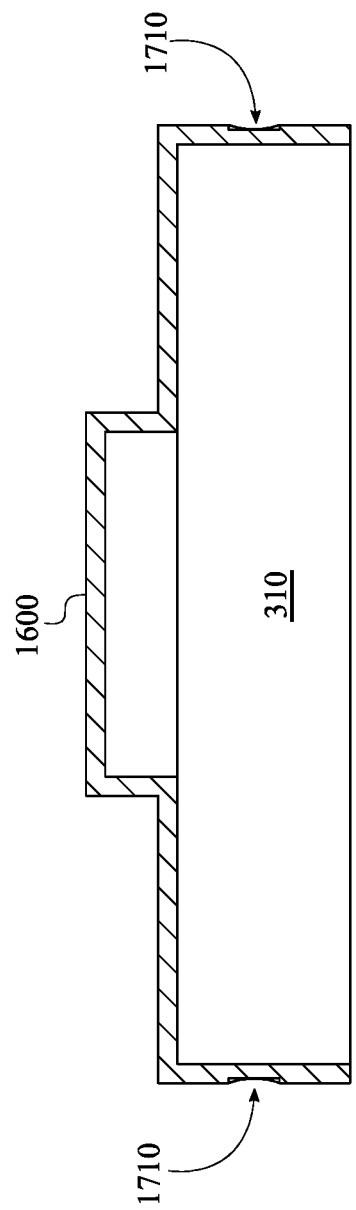
FIG. 18 is a cross-sectional view of the second cap taken along line 18-18 in FIG. 17 according to other embodiments.
Figure 19:
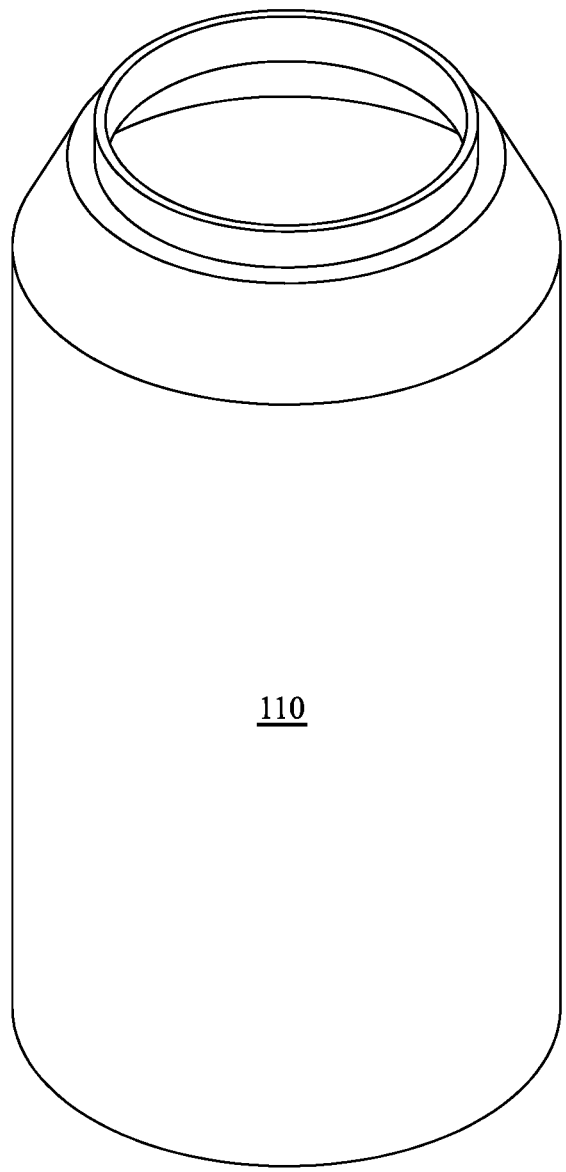
FIG. 19 is a top-front perspective view of a first body of the drinking vessel according to certain embodiments.

FIGS. 16-18 depict various views of the second cap 310 according to other embodiments. In general, the second cap 310 can be of any shape, size, type or kind; and include any material, features, orientation, location, quantity, components, and arrangements of components that would fulfill the objectives and intents of the instant disclosure. However, the secondary cap 310 is preferably fabricated using material similar to and/or compatible with the material of the storage container 105. The secondary cap 310 preferably has a circular, disc-like shape with a hollow underside. The second cap 310, for example, includes a first nub 1600, which is utilized to demountably couple the storage container 105 to the first body 110.

Figure 20:
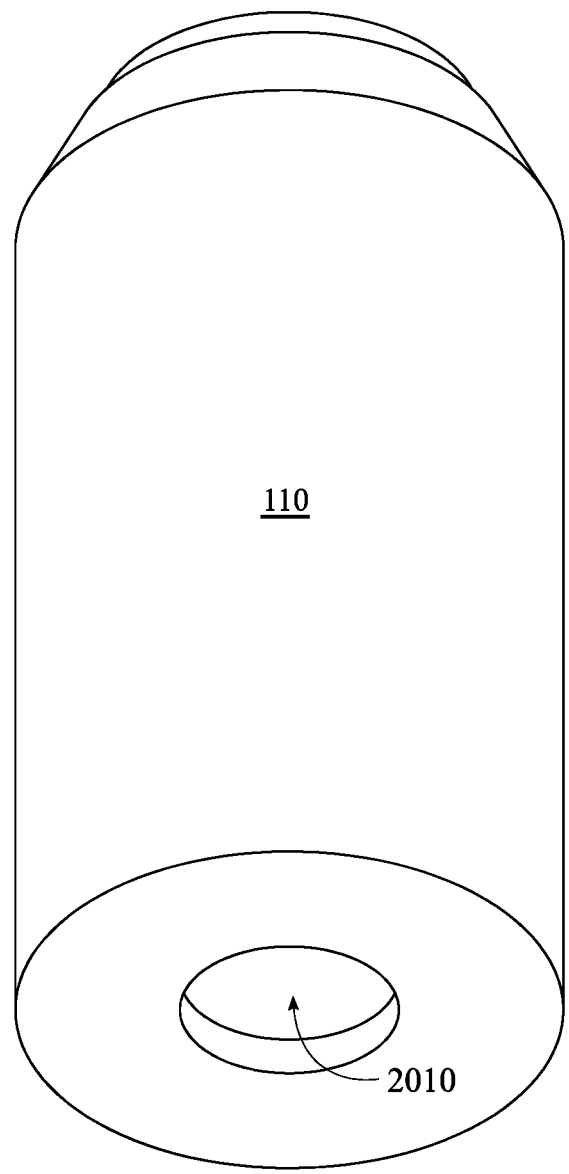
FIG. 20 is a bottom-front perspective view of the first body according to yet still other embodiments.
Figure 21:
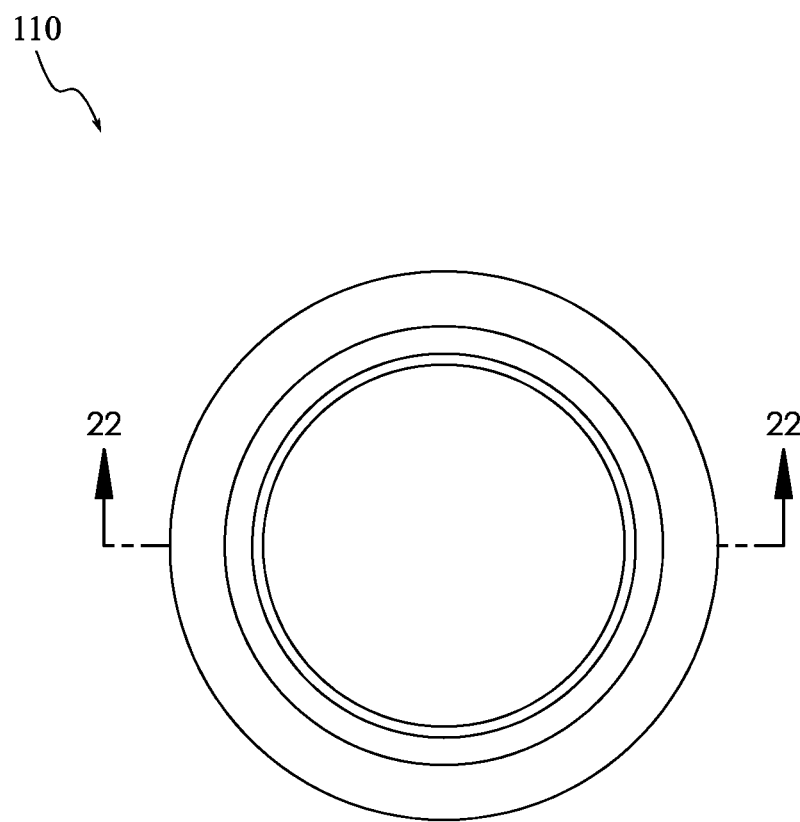
FIG. 21 is a top view of the first body according to some embodiments.

The first nub 1600 preferably has threaded structures that facilitate threadable engagement of the second cap 310 to the first body 110 via the recess 2010 (depicted in FIG. 20), which also include threadable structures (discussed further below). The secondary cap 310 has an overall height substantially similar to the difference in height between the storage container 105 and the insert 400. According to certain embodiments, the second cap 310 includes an outer diameter substantially similar to the outer diameter of the first body 110.

FIG. 18 depicts a cross-sectional view of the second cap 310 taken along line 18-18 of FIG. 17 according to yet still other embodiments. For example, the second cap 310 has an inner diameter similar to the outer diameter of the second ring 910. The second cap 310 is preferably selectively/demountably positioned atop the second cap 310, as illustrated in FIGS. 3 and 4. According to other embodiments, the second cap 310 includes a plurality of indentations 1710. In general, the plurality of indentations 1710 can be of any shape, size, type or kind; and include any material, features, orientation, location, quantity, components, and arrangements of components that would fulfill the objectives and intents of the instant disclosure. However, the plurality of indentations 1710 are preferably positioned along the exterior side/lateral surfaces of the second cap 310 according to certain embodiments.

For example, each of the plurality of indentations 1710 are of a depth that facilitate grasping the second cap 310 to position the component on and/or remove the component from the second body 300 and/or the first body 110. In other words, the plurality of indentations 1710 allow the second cap 310 to be manipulated relative to the second body 300 and/or the first body 110. In general, the first nub 1600 can be of any shape, size, type or kind; and include any material, features, type or kind, orientation, location, quantity, components, and arrangements of components that would fulfill the objectives and intents of the instant disclosure. However, it is preferred that the first nub 1600 is centrally positioned atop the second cap 310. The first nub 1600 preferably has a shape and size that complements the shape and size of the recess 2010. For example, the complementary shape and size of the first nub 1600 compared to the recess 2010 allows the recess 2010 to receive the first nub 1600 and thereby demountably couple the storage container 105 to the first body 110. The first nub 1600 is preferably threaded to facilitate threadable engagement with the recess 2010.

Figure 22:
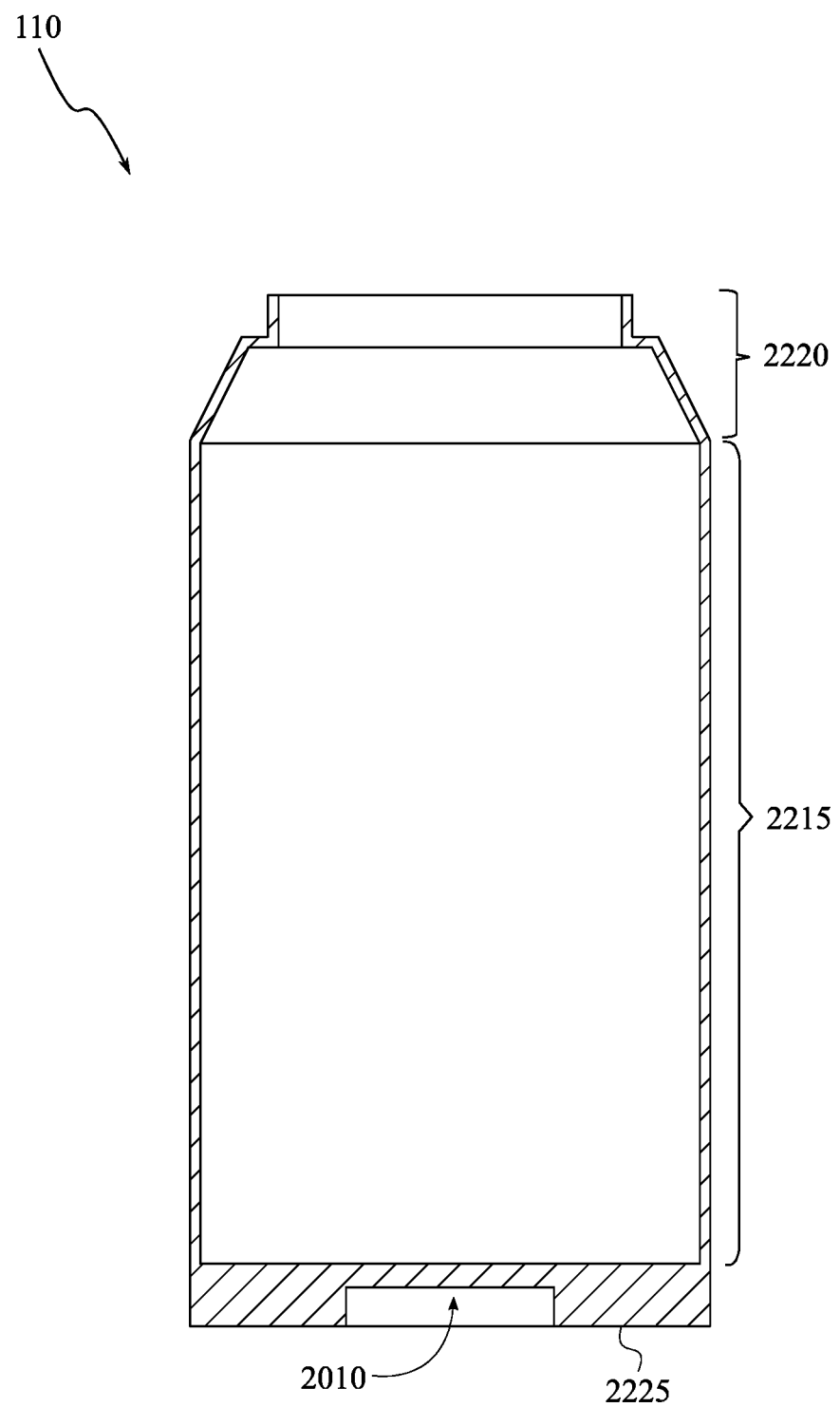
FIG. 22 is a cross-sectional view of the second body taken along line 22-22 of FIG. 21 according to other embodiments.

Turning now to the first body 110. FIGS. 19-22 depict various views of the first body 110 according to other embodiments. Here, FIG. 22 depicts a cross-sectional view of the first body 110 along line 22-22 of FIG. 21. The first body 110 is preferably a handheld container/vessel that stores liquids and includes a narrow mouth. In certain embodiments, the first body 110 includes a chamber 2215, a top face 2220, and a bottom face 2225. For example, the first body 110 is hollow, open-faced, and substantially cylindrical in shape. As discussed above, the top face 2220 is preferably open-faced. In other embodiments, the bottom face 2225 is configured to allow the storage container 105 to be demountable affixed thereto.

In general, the first body 110 can be of any shape, size, type or kind; and include any material, features, orientations, locations, quantity, components, and arrangements of components that would fulfill the objectives and intents of the instant disclosure. However, it is preferred that the first body 110 has a height substantially greater than the overall height of the first cap 115. The bottom end 2225 preferably has a diameter similar to that of the storage container 105. The top end 2220 preferably has a diameter similar to the inner diameter of the first cap 115 such that the first cap 115 can be attached/coupled to the top face 2220, as illustrated in FIGS. 1, 2, 5, and 6. In other embodiments, the diameter of the top face 2220 is narrower compared to that of the bottom face 2225 as included in typical jugs known in the art. As discussed above, the first body 110 preferably includes the recess 2010.

In general, the recess 2010 can be of any shape, size, material, type or kind; and include any features, orientations, locations, quantity, components, and arrangements of components that would fulfill the objectives and intents of the instant disclosure. The recess 2010 preferably has a shape and size that compliments the shape and size of the first nub 1600. The recess 2010 is typically centrally positioned on the exterior surface of the bottom face 2225. For example, to attach storage container 105 to drinking vessel 200, the recess 2010 receives (e.g., engages) the first nub 1600. In some embodiments, the recess 2010 includes threading structures on its exterior that complements threading structures included on the inner surface of the first nub 1600. In other words, the recess 2010 can threadably engage the first nub 1600. In certain embodiments, the recess 2010 includes a magnet (i.e. is magnetized) complementary to a magnet included in the first nub 1600. The storage container 105, using the first nub 1600, preferably demountably attaches to the bottom face 2225 via the recess 2010.

Figure 7:
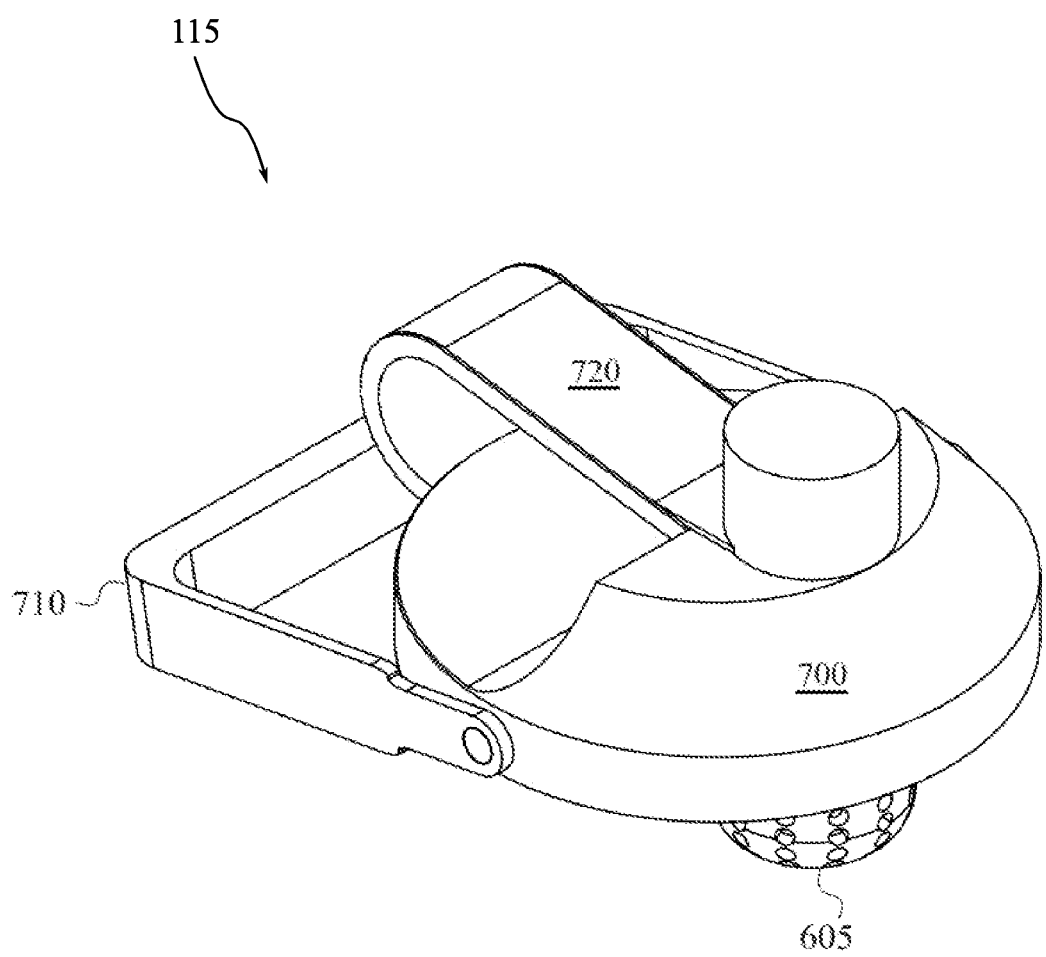
FIG. 7 is a perspective view of a first cap of the drinking vessel according to yet still other embodiments.
Figure 8:
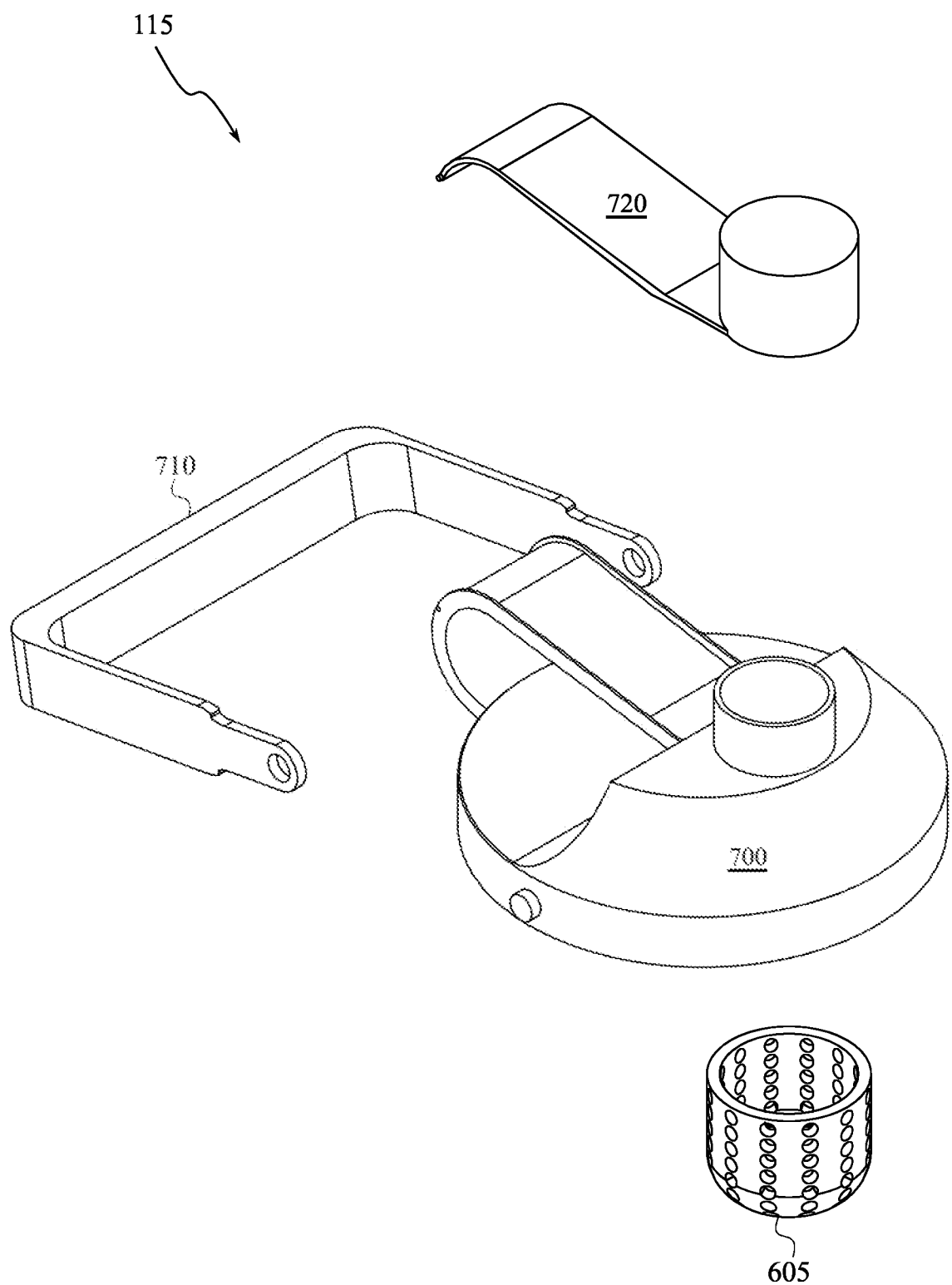
FIG. 8 is an exploded view of the first cap according to some embodiments.

As previously discussed, the drinking vessel 200 includes the first cap 115 according to certain embodiments. In general, the first cap 115 is a component that seals the opening of the top face 2220 (i.e. the first body 110), in accordance with certain embodiments. FIGS. 7 and 8 depict perspective and exploded views, respectively, of the first cap 115 according to certain embodiments. The first cap 115 demountably covers (e.g., is demountable positioned on) the top face 2220, which is the opening of the chamber 2215. In other embodiments, the first cap 115 includes a second lid 720, a first handle 710, a second handle 2305, and a strainer 605 interconnected via a first lid 700. All of the aforementioned components of the first cap 115 except the strainer 605 are preferably positioned external to the drinking vessel 200 when the first cap 115 is demountably affixed to the first body 110. The strainer 605 is preferably positioned adjacent to the port. The strainer 605 is preferably utilized to restrain the contents of the drinking vessel 200 (e.g., ice, tea/coffee bags, fruit or other items used to infuse drinks). In certain embodiments, the first lid 700 has an inner diameter similar to the outer diameter of the top face 2220, as depicted in FIGS. 5 and 6. In general, the first cap 115 can be of any shape, size, type or kind; and include any material, features, orientation, location, quantity, components, and arrangements of components that would fulfill the objectives and intents of the instant disclosure. FIGS. 23-27 depict various views of the first lid 700, in accordance with other embodiments. The first lid 700 is typically a removable cover for the first body 110. The first lid 700 preferably includes threadable structures to threadably engage those of the top face 2220. The first lid 700 preferably includes second nubs 2310, second handle 2305, first apertures 2320, and port 2315. Here, the port 2315 is positioned towards an end (i.e. the periphery) of the first lid 700 opposite the second handle 2305. The second handle 2305, in other embodiments, extends from a position proximate to the port 2315 to an end (i.e. the periphery) of the first lid 700 opposite the port 2315.

In general, the second handle 2305 can have a shape, include the features, and/or be of a type or kind similar to fixed, carrying handles typically associated with jugs and other similar drinking vessels. However, the second handle 2305 preferably includes a recessed region that longitudinally extends along the face of the second handle 2305 and is positioned on the top surface thereof. The recessed region preferably has a shape complementary to tail 2815 (shown in FIG. 28) of the second lid 720. Hence, the tail 2815 sits flush with the second handle 2305 when the second lid 720 is demountably coupled to the first lid 700 and thereby restricts unwarranted removal of the second lid 720 when the second handle 2305 is grasped. In other words, the tail 2815 is partially positioned within the recessed region of the second handle 2305 when the second lid 720 is demountably coupled to the second handle 2305 and the port 2315.

Figure 23:
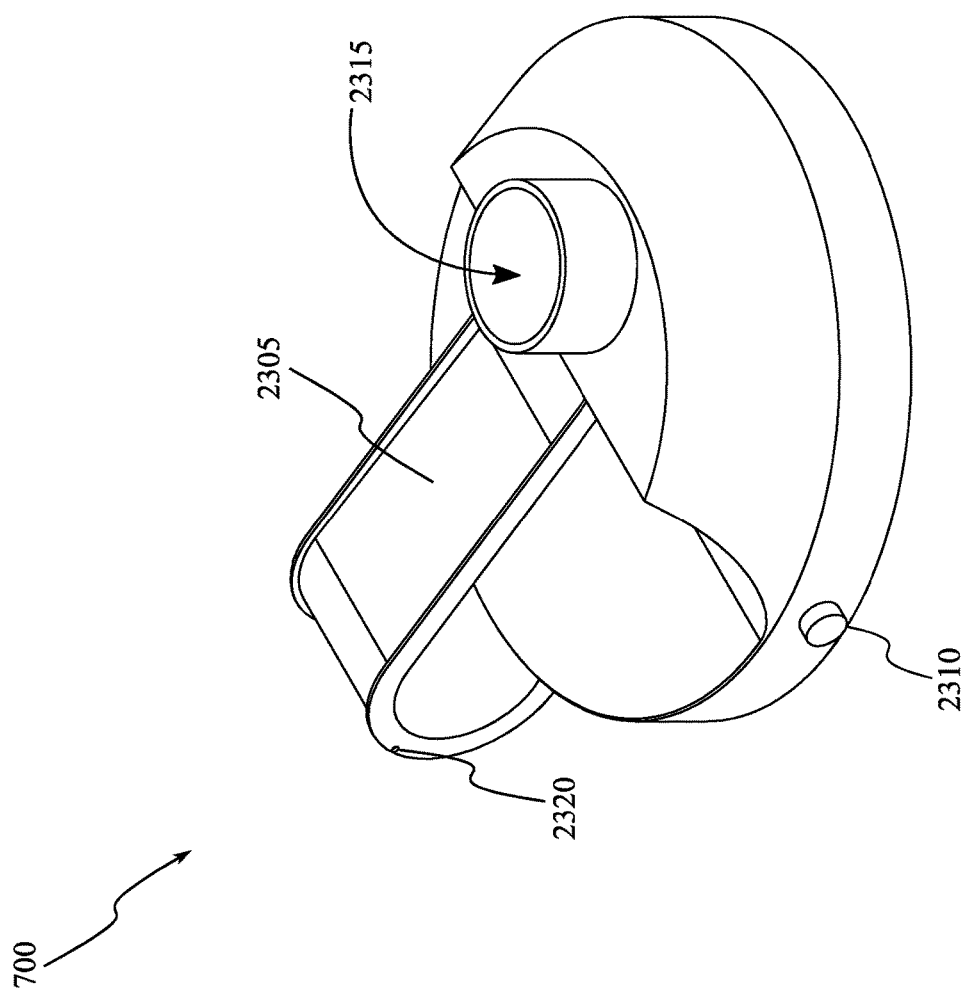
FIG. 23 is a top-front perspective view of a first lid of the first cap according to certain embodiments.
Figure 24:
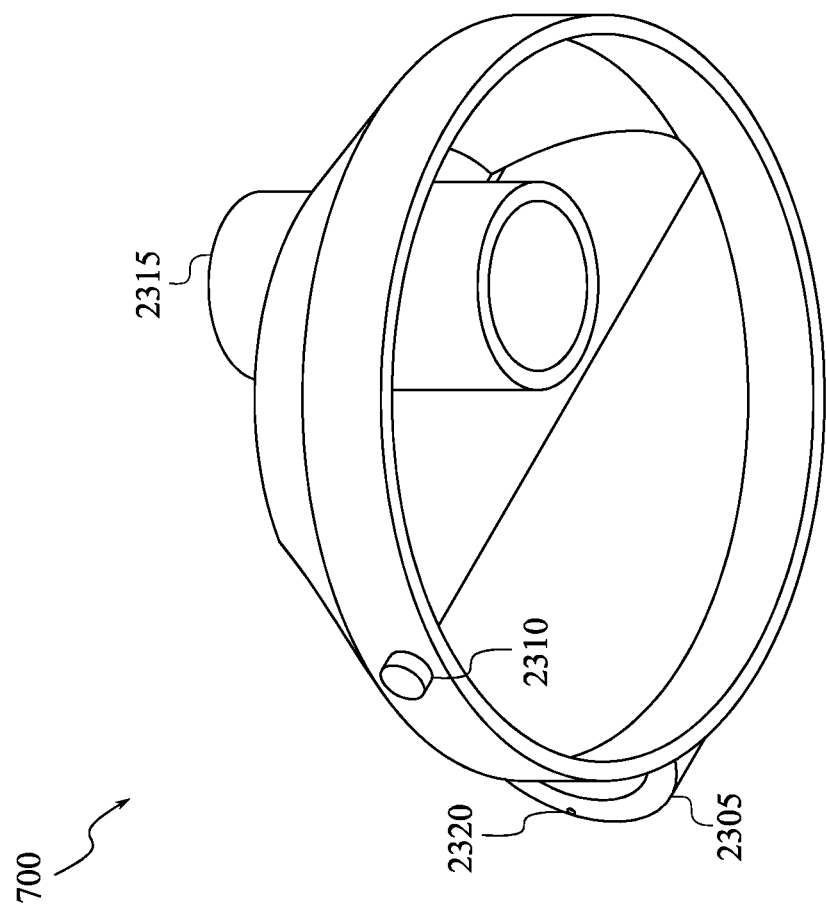
FIG. 24 is a bottom-front perspective view of the first lid according to yet still other embodiments.
Figure 25:
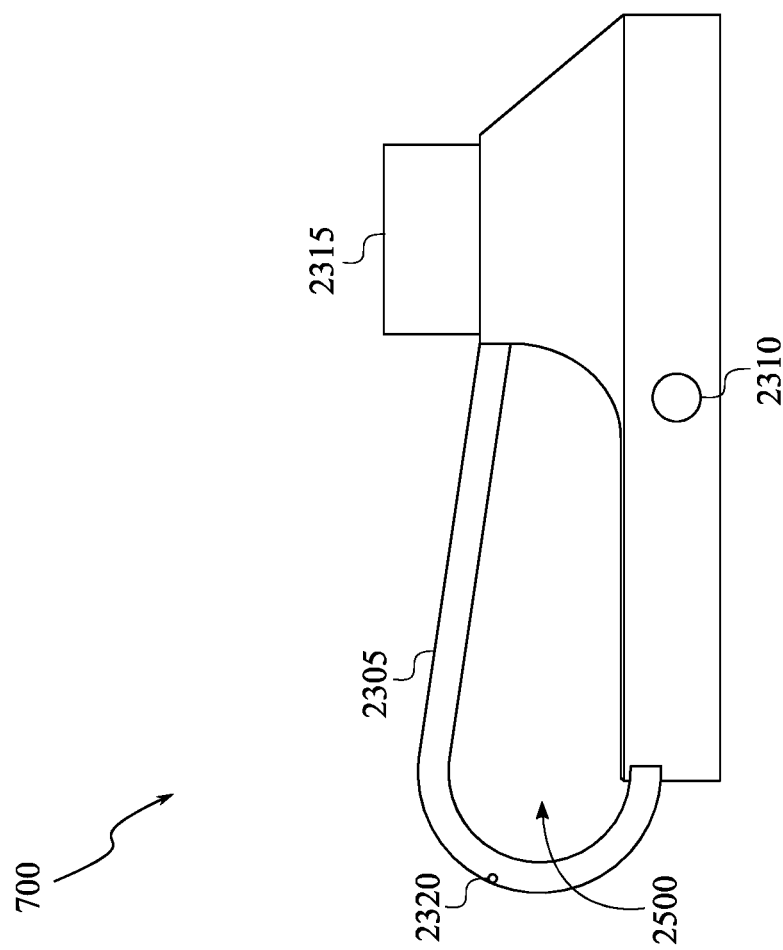
FIG. 25 is a side view of the first lid according to some embodiments.
Figure 26:
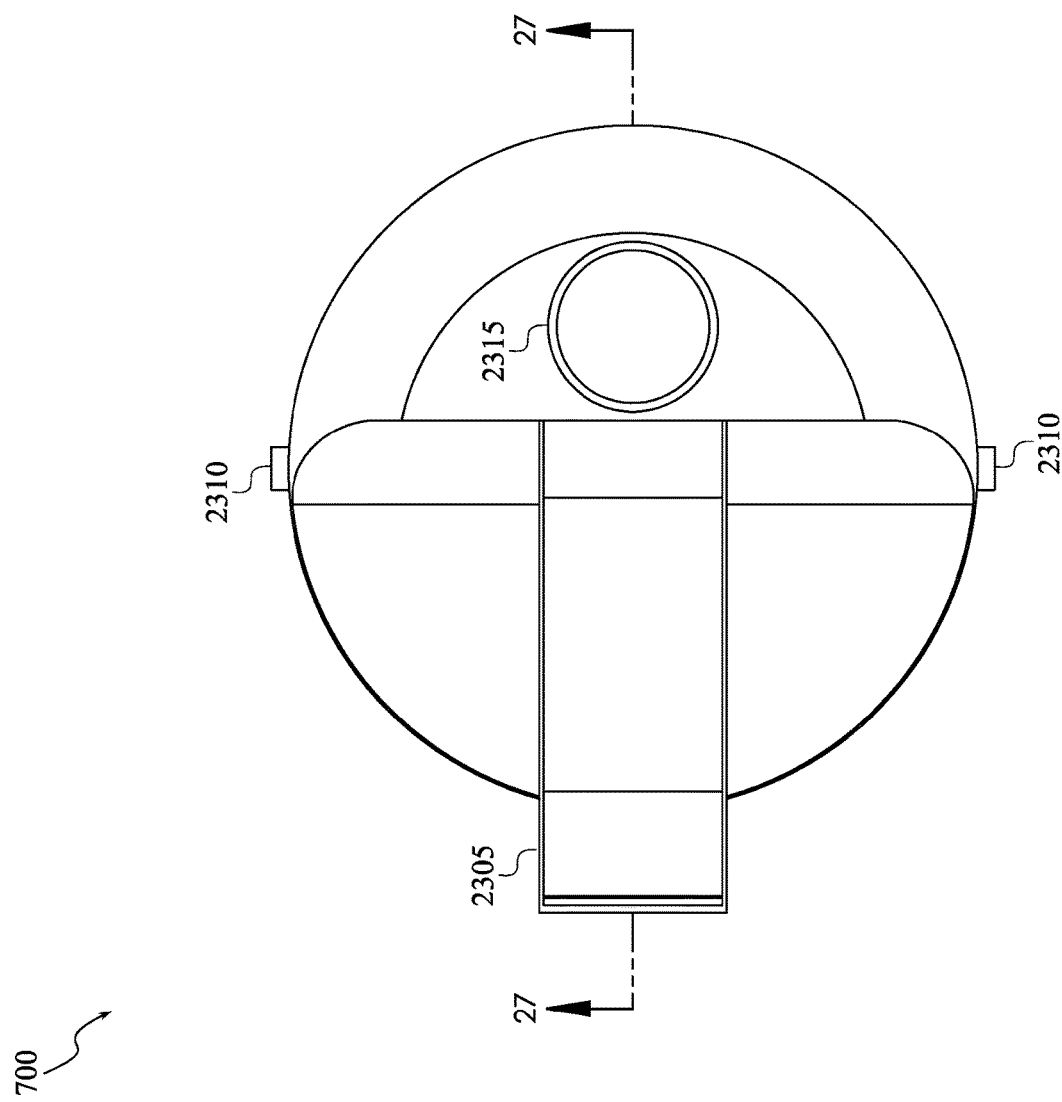
FIG. 26 is a top view of the first lid according to other embodiments.

The second handle 2305 preferably extends from a position proximate to the port 2315 to a position distal to both the second nubs 2310 and the port 2315 on the external sidewall (i.e. periphery) of the first lid 700 opposite the port 2315, as depicted in FIG. 23. For example, the second handle 2305 is substantially planar and curves from a position proximate to the port 2315 to a position distal to both the second nubs 2310 and the port 2315 and thereby forms aperture 2500, which is used to grasp the second handle 2305.

Figure 27:
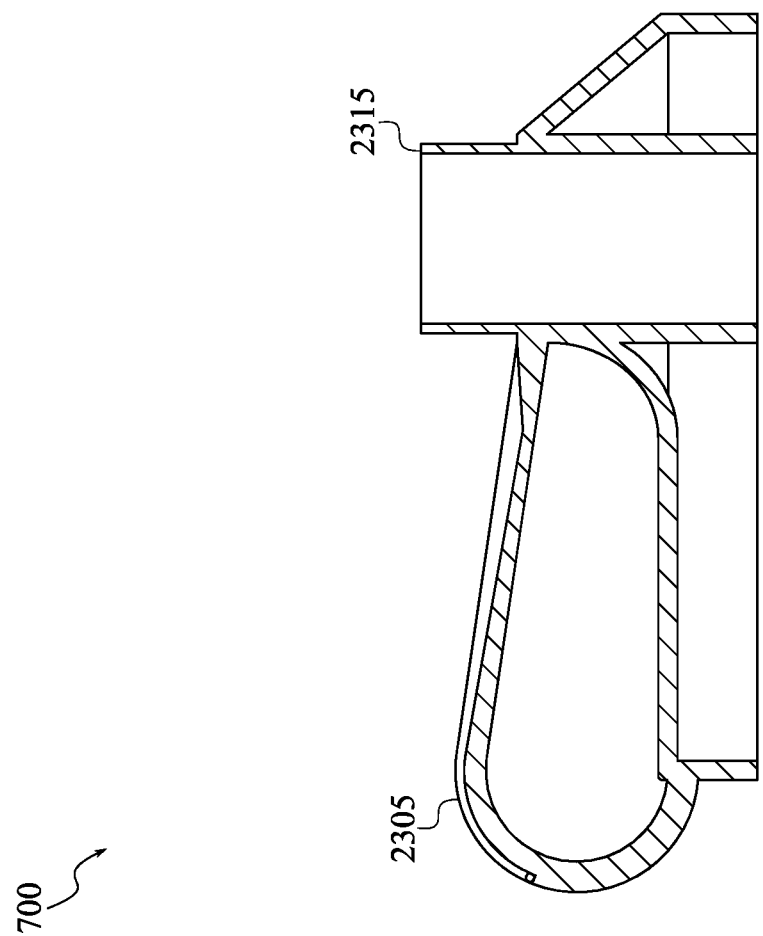
FIG. 27 is a cross-sectional view of the first lid taken along line 27-27 of FIG. 26 according to certain embodiments.
Figure 32:
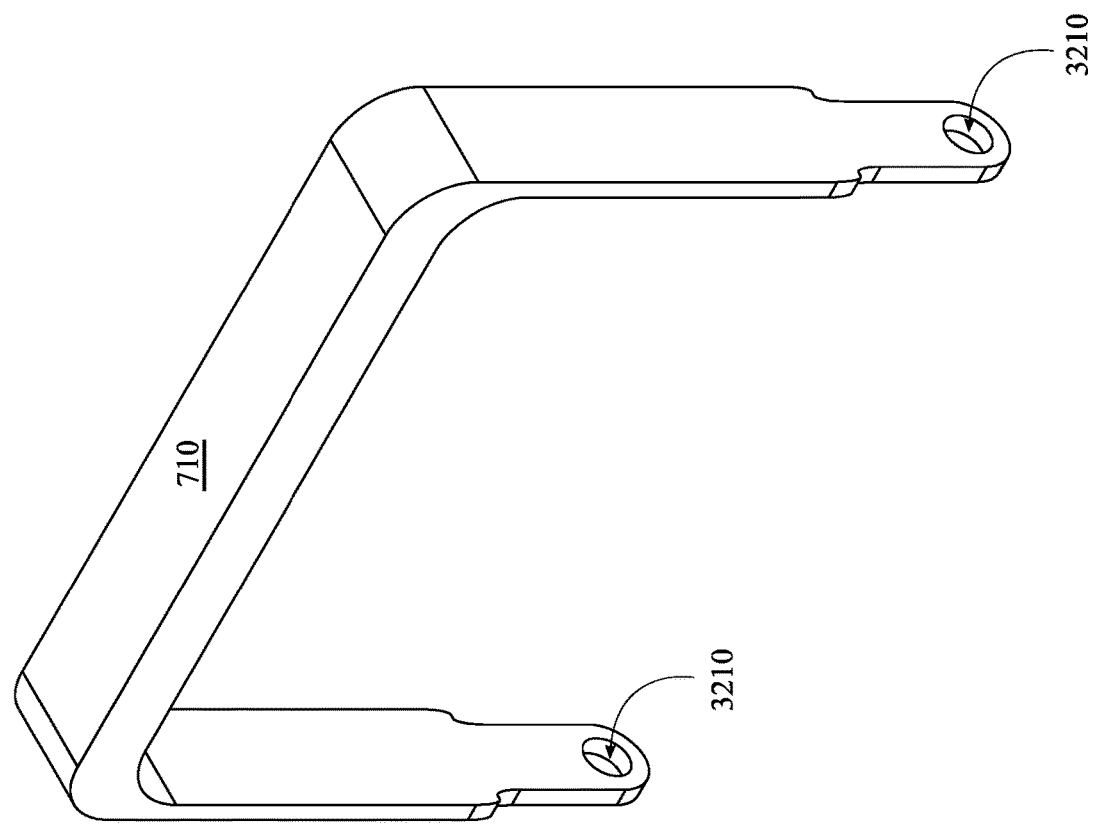
FIG. 32 is a perspective view of a first handle of the first cap according to some embodiments.
Figure 33:
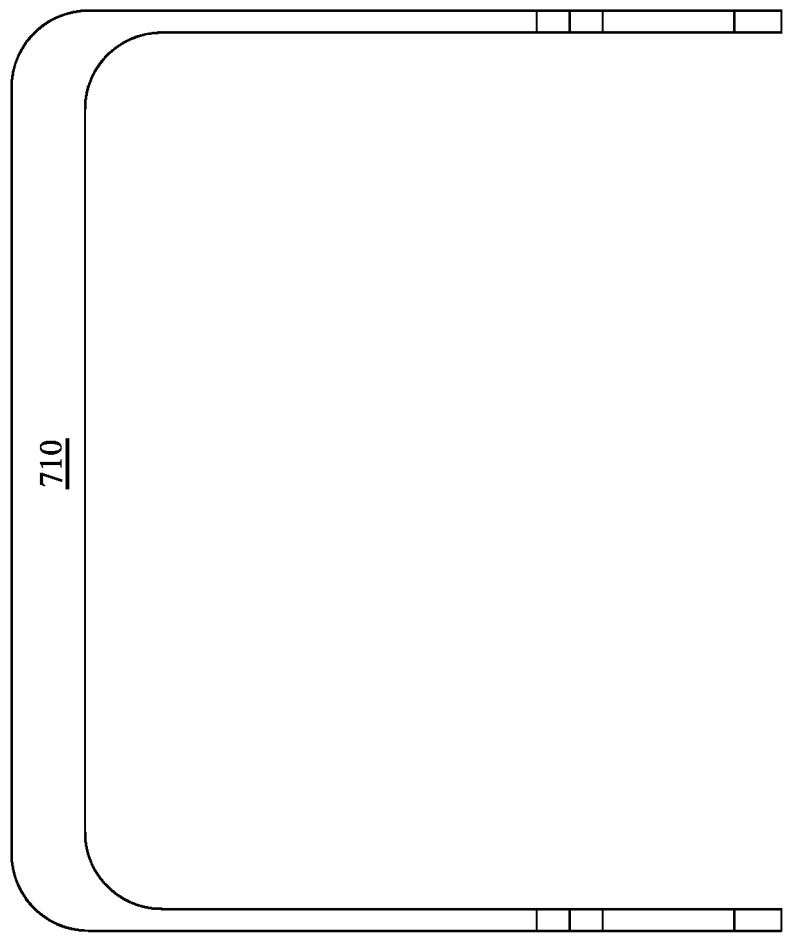
FIG. 33 is a front view of the first handle according to other embodiments.
Figure 34:
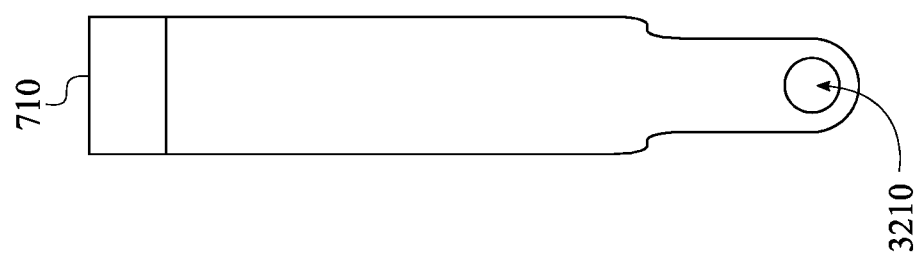
FIG. 34 is a side view of the first handle according to certain embodiments.

The port 2315 preferably has a cylindrical, hollow, and tube-like shape. In other embodiments, the port 2315 protrudes above and below the first lid 700, as illustrated in FIG. 27. For example, the second nubs 2310 are each externally positioned on the side (i.e. periphery) of the first lid 700 opposite each other. The second nubs 2310 are protrusions that laterally extend away from of the side of the first lid 700 and allow the first handle 710 to rotatably couple to the first lid 700. As such, the second nubs 2310 and the first handle 710 preferably include complementary shapes. The first handle 710 is preferably pivotably attached to the first lid 700 (e.g. via the second nubs 2310). FIGS. 32-34 depict perspective, front, and side views of the first handle 710 according to yet still other embodiments. Here, the first handle 710 includes second apertures 3210 positioned on each end thereof. The second apertures 3210 are each complementary in shape, size, and diameter to the second nubs 2310.

The second apertures 3210 each preferably receive one of the second nubs 2310 and thereby allow the first handle 710 to be pivotably attached to the first cap 115. Hence, the first handle 710 preferably pivots relative to the first lid 700 when the second apertures 3210 each receive one of the second nubs 2310. Turning now to the second handle 2305. The first apertures 2320 are, for example, positioned in the second handle 2305 distal to the port 2315, as reflected in FIGS. 23-25. In certain embodiments, the first apertures 2320 extend through the periphery of the second handle 2305. The first apertures 2320 are each configured to receive one of the third nubs 2810 (discussed further below) and thereby allow the second lid 720 to be pivotably attached to the second handle 2305. Hence, the first apertures 2320 and the third nubs 2810 preferably are complementary in shape, size, and diameter.

Figure 28:
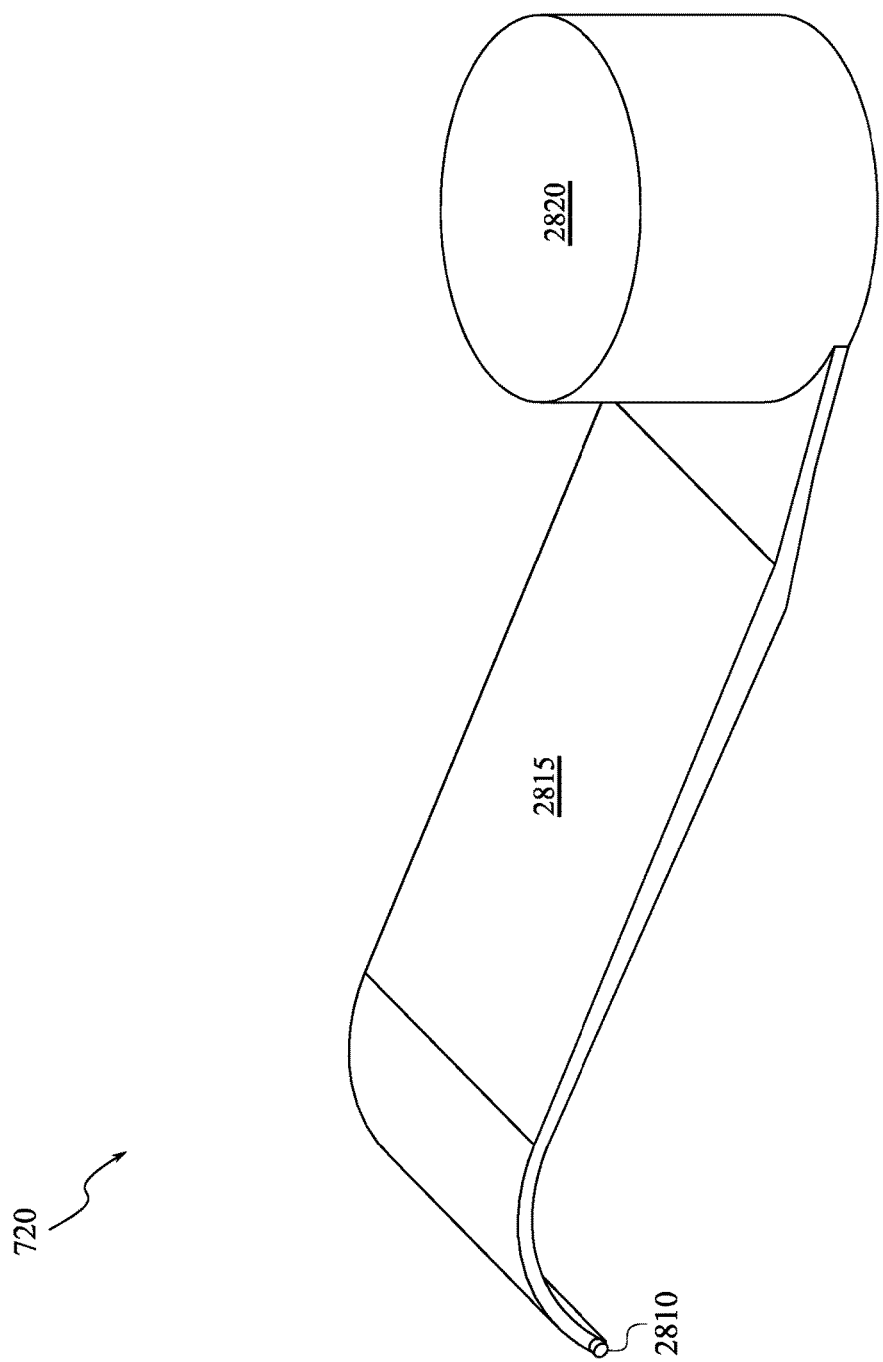
FIG. 28 is a perspective view of a second lid of the first cap according to some embodiments.
Figure 29:
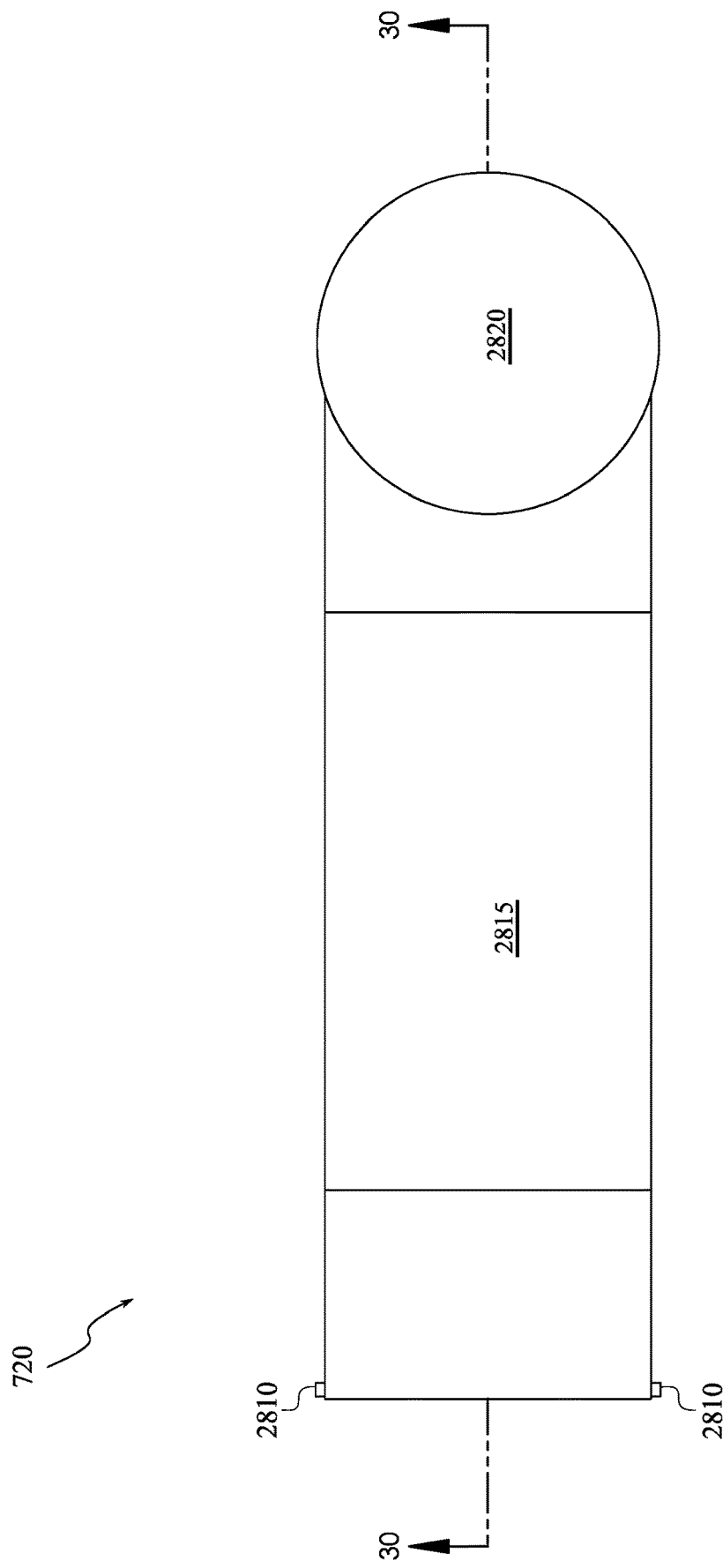
FIG. 29 is a top view of the second lid according to other embodiments.
Figure 30:
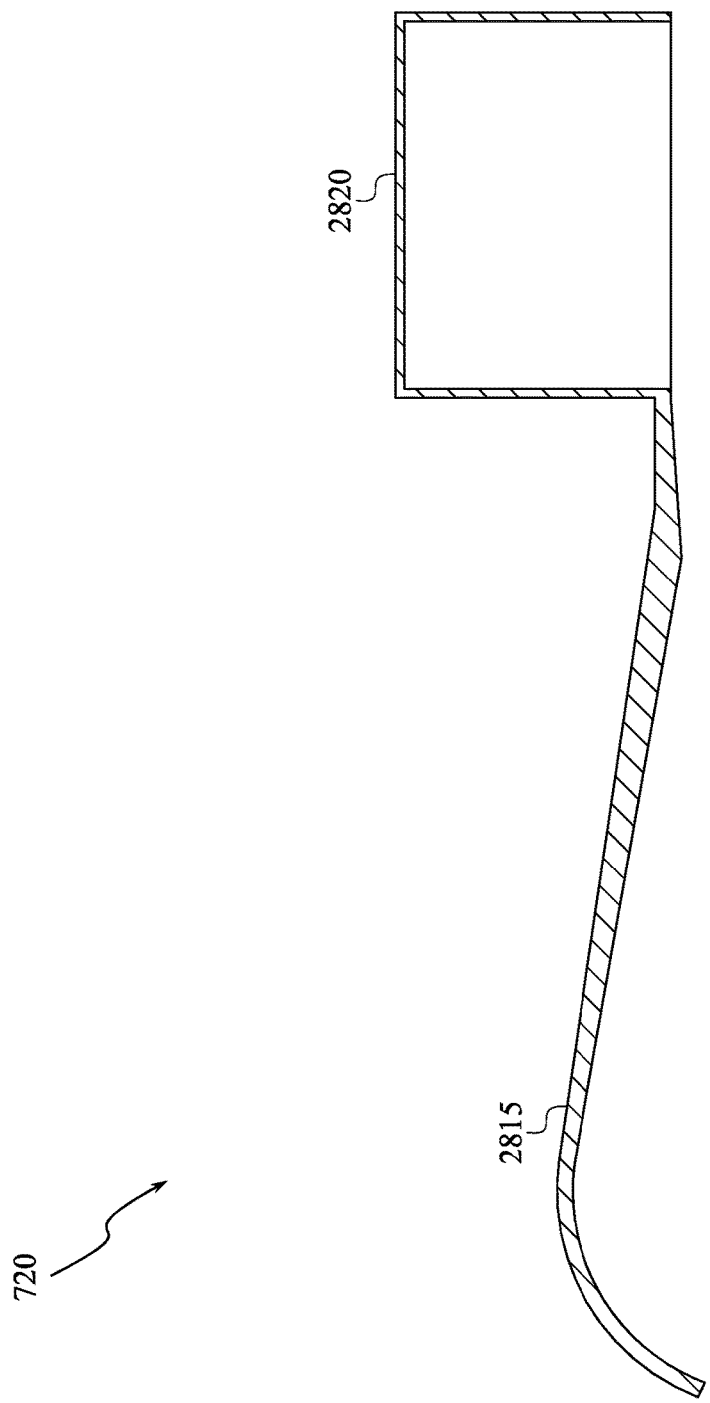
FIG. 30 is a cross-sectional view of the second lid taken along line 30-30 of FIG. 29 according to certain embodiments.

FIGS. 28-30 depict a side, top, and side views, respectively, of the second lid 720 according to other embodiments. In general, the second lid 720 is a removable cover for the port 2315. The second lid 720 preferably includes a crown 2820 and the third nubs 2810 interconnected via a tail 2815. Here, the tail 2815 is preferably positioned adjacent to the crown 2820. The third nubs 2810 are preferably positioned on the periphery of the tail 2815 opposite the crown 2820. The crown 2820 selectively receives (e.g., is demountably couple to) the port 2315. The crown 2820 preferably includes an inner diameter that is substantially similar to the external diameter of the port 2315 (e.g., which allows the two components to be selectively wedged together). The second lid 720 is pivotably attached to the second handle 2305 via the tail 2815. For example, the first apertures 2320 receive the third nubs 2810 and thereby allows the second lid 720 to pivotably attach to the second handle 2305 via the tail 2815.

Figure 31:
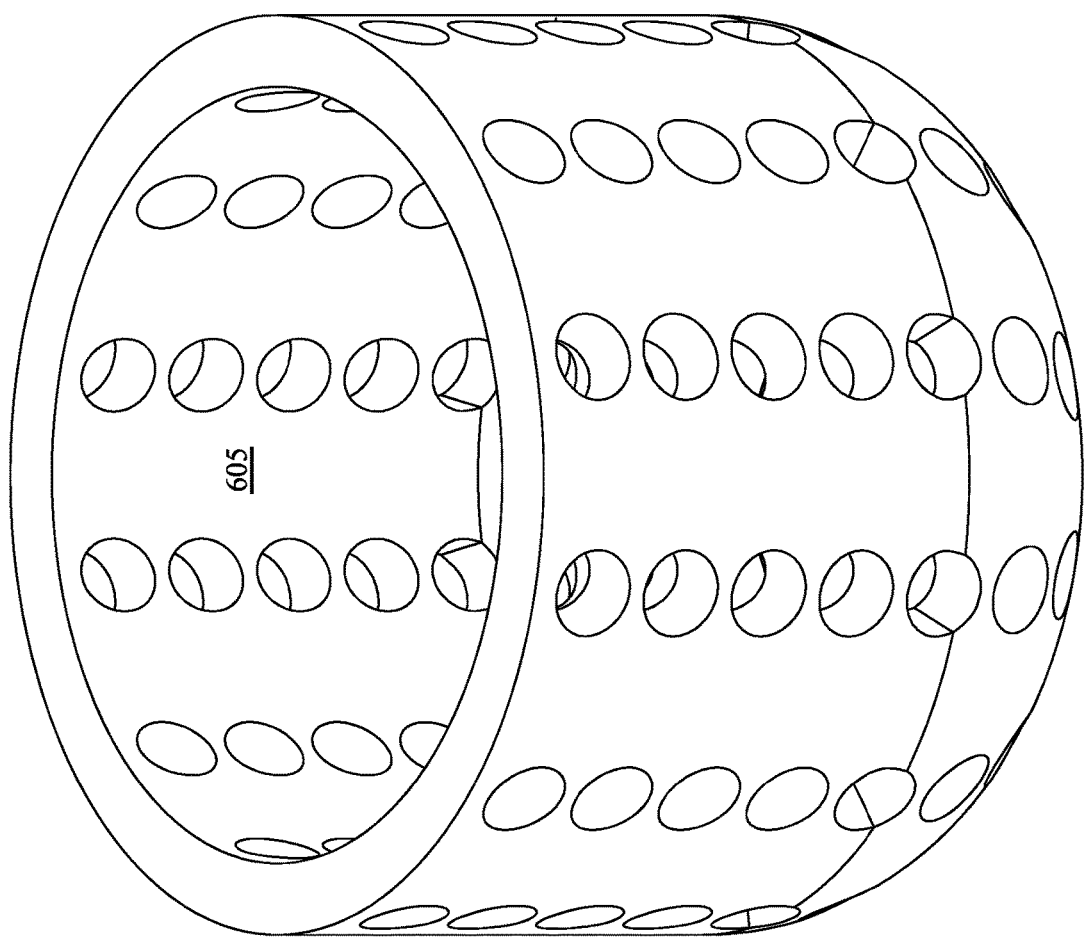
FIG. 31 is a perspective view of a strainer of the first cap according to yet still other.

Turning now to FIG. 31, which depicts a perspective view of the strainer 605 according to certain embodiments. In general, the strainer 605 is a device that filters or separates liquids from solid matter included within the first body 110. The strainer 605 can be of any shape, size, type or kind; and include any material, features, orientation, location, quantity, components, and arrangements of components that would allow the embodiments disclosed herein to fulfill the objectives and intents of the instant disclosure. However, the strainer 605 is preferably made of a material(s) similar to and/or compatible with the material of the first cap 115. The diameter of the strainer 605 is preferably similar to the diameter of the bottom portion of the port 2315 (i.e. the portion of the port 2315 that extrudes beneath the bottom surface of the first lid 700). In certain embodiments, the aforementioned similarity in diameters allows the strainer 605 and the port 2315 to be wedged together. The strainer 605 is removably attached to the bottom end of the port 2315. In certain embodiments, the strainer 605 contains a plurality of holes that contain and/or constrain solid material while allowing the liquid material to freely pass therethrough.

Although the invention has been explained in relation to its preferred embodiment, it is to be understood that many other possible modifications and variations can be made without departing from the spirit and scope of the invention.

The invention claimed is:

1. A drinking vessel storage container combination ("combination") comprising:
   a first body;
   a first cap demountably coupled to the first body;
   a storage container demountably coupled to the first body opposite the first cap;
   wherein
   the first body comprises a chamber, a top face, and a bottom face;
   one or more of the first body and the storage container comprise a high impact, thermal insulating material;
   the first cap comprises a lid, a port, a first handle, a second handle, and a strainer;
   the lid is pivotably attached to the second handle;
   the first handle is pivotably attached to the first cap;
   the storage container comprises a second body, a second cap, a panel, and an insert;
   the first body is hollow, open-faced, and substantially cylindrical in shape;
   the top face is open;
   the bottom face is configured to allow the storage container to be demountable affixed thereto;
   the strainer is positioned adjacent to the port and within the chamber when the first cap is demountably affixed to the first body;
   the storage container is substantially cylindrical;
   the insert is selectively positioned within the second body;
   the panel is selectively positioned on top of the insert; and
   the second cap is demountably affixed to the second body and the bottom face;
   the second body comprises a first ring, a second ring, and a third ring concentrically positioned therein;
   the second ring positioned adjacent to the first ring and third ring;
   the first ring is positioned within the second body;
   the third ring is externally positioned on the second body; and
   the second ring is greater in height compared to the first ring and the third ring.

2. The combination of claim 1, wherein
   the panel and the second ring are similar in diameter; and
   the panel is positioned flush within the second ring when positioned within the second body.

3. The combination of claim 2, wherein
   the second cap comprises a nub;
   the nub is centrally positioned atop the second cap;
   the bottom face comprises a recess centrally positioned on the bottom face;
   the second cap is demountably affixed to the first body when the recess receives the nub.

4. The combination of claim 3, wherein
   the insert comprises a divider medianly and vertically positioned therein;
   the insert and the first ring are about equal in height when the insert is positioned within the second body;
   the insert and the first ring are about equal in diameter; and
   the insert sits flush within the first ring when the insert is positioned within the second body.

5. The combination of claim 4, wherein the panel is positioned on the first ring proximate to the second cap when the panel is positioned within the second body and the second cap is demountably coupled to the second body.

6. The combination of claim 5, wherein
   the lid comprises a crown and a tail;
   the tail is positioned adjacent to the crown;
   the crown selectively receives the port; and
   the lid is pivotably attached to the second handle via the tail portion.

7. A drinking vessel storage container combination ("combination") comprising:
   a first body;
   a first cap demountably coupled to the first body;
   a storage container demountably coupled to the first body opposite the first cap;
   wherein
   one or more of the first body and the storage container comprise a high impact, thermal insulating material;
   the first body is hollow, open-faced, and substantially cylindrical in shape;
   the first body comprises a chamber, a top face, and a bottom face;
   the top face is open;
   the bottom face is configured to allow the storage container to be demountable affixed thereto;
   the first cap comprises a lid, a port, a first handle, a second handle, and a strainer;
   the lid is pivotably attached to the second handle;
   the first handle is pivotably attached to the first cap;
   the strainer is positioned adjacent to the port and within the chamber when the first cap is demountably affixed to the first body;
   the storage container comprises a second body, a second cap, a panel, and an insert;
   the insert is selectively positioned within the second body;
   the panel is selectively positioned on top of the insert;
   the second cap is demountably affixed to the second body and the bottom face;
   the second body comprises a first ring, a second ring, and a third ring concentrically positioned therein;
   the second ring positioned adjacent to the first ring and third ring;
   the first ring positioned within the second body;
   the second ring positioned above the first ring and third ring;
   the third ring is externally positioned on the second body;
   the second ring is greater in height compared to the first ring and third ring;
   the lid comprises a crown and a tail portion positioned adjacent to the crown;
   the crown receives the port;
   the lid is pivotably attached to the second handle via the tail portion;

the bottom face comprises a recess;
the second cap comprises a nub; and
the recess receives the nub and thereby demountably couples the storage container to the first body.

8. The combination of claim 7, wherein
the panel and the second ring are similar in diameter;
the panel is positioned on the first ring proximate to the second cap when the panel is positioned within the second body and the second cap is demountably coupled to the second body;
the panel is positioned flush within the second ring when positioned within the second body.

9. The combination of claim 8 wherein
the insert comprises a divider medianly positioned therein;
the insert and the first ring are about equal in height when the insert is positioned within the second body;
the insert and the first ring are about equal in diameter; and
the insert sits flush within the first ring when the insert is positioned within the second body.

\* \* \* \* \*